United States Patent
Nichols et al.

(10) Patent No.: US 9,475,652 B2
(45) Date of Patent: Oct. 25, 2016

(54) CORE WHEEL PROCESSING SYSTEM AND METHOD

(71) Applicant: Wheel Recovery Systems, LLC, Maybrook, NY (US)

(72) Inventors: Bruce Nichols, Knoxville, TN (US); William Preston Garland, Knoxville, TN (US); Jeffery Ray Price, Knoxville, TN (US)

(73) Assignee: Wheel Recoverey Systems, LLC, Maybrook, NY (US)

( * ) Notice: Subject to any disclaimer, the term of this patent is extended or adjusted under 35 U.S.C. 154(b) by 221 days.

(21) Appl. No.: 14/298,212

(22) Filed: Jun. 6, 2014

(65) Prior Publication Data

US 2014/0365002 A1    Dec. 11, 2014

Related U.S. Application Data

(60) Provisional application No. 61/831,824, filed on Jun. 6, 2013.

(51) Int. Cl.
| | | |
|---|---|---|
| *G06F 7/00* | (2006.01) | |
| *B65G 47/48* | (2006.01) | |
| *B07C 5/342* | (2006.01) | |

(52) U.S. Cl.
CPC ............ *B65G 47/48* (2013.01); *B07C 5/3422* (2013.01)

(58) Field of Classification Search
None
See application file for complete search history.

(56) References Cited

U.S. PATENT DOCUMENTS

| 3,895,716 A | * | 7/1975 | Ugo ................... B29D 30/0016 |
| | | | 198/349 |
| 4,249,661 A | * | 2/1981 | Lem ....................... B65G 47/54 |
| | | | 198/367 |
| 4,778,060 A | * | 10/1988 | Wessner, Jr. .......... B07C 5/3412 |
| | | | 118/320 |
| 4,829,749 A | * | 5/1989 | Hiyama ............... B65G 1/1371 |
| | | | 193/35 G |
| 4,836,386 A | | 6/1989 | Smith |
| 5,318,911 A | | 6/1994 | Fine et al. |
| 5,638,657 A | | 6/1997 | Archer et al. |
| 5,667,079 A | | 9/1997 | Jongebloed |
| 5,916,458 A | | 6/1999 | Komoriya et al. |
| 5,998,753 A | | 12/1999 | Darchis et al. |
| 6,052,884 A | | 4/2000 | Steckler et al. |
| 6,137,577 A | | 10/2000 | Woodworth |
| 6,439,567 B1 | | 8/2002 | Ashley |
| 6,464,065 B2 | | 10/2002 | Herubel et al. |
| 7,086,618 B2 | | 8/2006 | Bitton et al. |

(Continued)

FOREIGN PATENT DOCUMENTS

| WO | WO03085416 | 10/2003 |
| WO | WO2008094535 | 8/2008 |

*Primary Examiner* — Yolanda Cumbess
(74) *Attorney, Agent, or Firm* — Pitts & Lake, P.C.

(57) ABSTRACT

A system for processing core wheels and associated method are disclosed. A sorting station is configured to allow sorting of a source of wheels according to a first set of criteria. A first conveyor is configured to receive a plurality of wheels conforming to the first criteria and to a first inspection station, disposed along the first conveyor. The first inspection station is configured to allow examination of the wheels to determine whether the wheels conform to a second criteria. A diverter mechanism, downstream of the first inspection station, is configured to divert wheels conforming to the second criteria from the first conveyor. A second conveyor is configured to receive the diverted wheels and to direct the diverted wheels to a second inspection station, whereby the diverted wheels may be inspected at the second inspection station to confirm that the diverted wheels conform to the second criteria.

49 Claims, 9 Drawing Sheets

(56) References Cited

U.S. PATENT DOCUMENTS

| | | |
|---|---|---|
| 7,178,574 B2 | 2/2007 | Nielsen |
| 8,322,639 B2 | 12/2012 | Gitschel |
| 8,398,006 B2 | 3/2013 | Gitschel |
| 2006/0088405 A1* | 4/2006 | Leimbach ......... B29D 30/0016 414/801 |
| 2006/0136249 A1 | 6/2006 | Kagan et al. |
| 2006/0151451 A1 | 7/2006 | Smith, Jr. et al. |
| 2006/0206236 A1 | 9/2006 | Smyth |
| 2008/0302633 A1 | 12/2008 | Snow et al. |
| 2008/0304053 A1 | 12/2008 | Snow et al. |
| 2009/0244284 A1 | 10/2009 | Suita et al. |
| 2009/0314608 A1 | 12/2009 | Rogers et al. |
| 2012/0211471 A1 | 8/2012 | Mercier |

* cited by examiner

CORE WHEEL PROCESSING SYSTEM AND METHOD

CROSS-REFERENCE TO RELATED APPLICATIONS

This application claims the benefit of U.S. Provisional Patent Application Ser. No. 61/831,824, filed on Jun. 6, 2013, which is incorporated herein in its entirety by reference.

STATEMENT REGARDING FEDERALLY-SPONSORED RESEARCH OR DEVELOPMENT

Not Applicable

BACKGROUND OF THE INVENTION

1. Field of Invention

The invention relates to reclamation of wheels. More specifically, this invention relates to a system and method for identifying wheel types and models of usable wheels.

2. Description of the Related Art

Used automobile wheels are often salvageable either for recycling of their constituent components or for additional use as a wheel. For example, if a used automobile wheel is not too badly worn or damaged, it may be repaired or refurbished as necessary and reused as an automobile wheel. Alternatively, a used automobile wheel may be broken down into its constituent components, whereupon the constituent components may be melted and recycled or otherwise routed for subsequent use.

Aluminum automobile wheels are often made primarily of high purity aluminum alloy. However, certain designs of aluminum automobile wheels may also comprise paint, clearcoat, chrome plating, lead weights, brass, rubber, stainless steel, iron, or other materials. If a high purity aluminum alloy wheel is melted while contaminated with too much of these other materials, the composition of the resultant melt will be a less pure aluminum alloy having a decreased value as compared to a more pure aluminum alloy. Therefore, prior to reclaiming and/or recycling of automobile wheels, it is often desirable to separate those automobile wheels which comprise high purity aluminum alloy and which do not include high levels of additional contaminants from those automobile wheels which either a.) are not fabricated primarily from high purity aluminum alloy; or b.) further comprise an unacceptably high amount of additional contaminants. In several reclaiming and/or recycling applications, it is desirable to sort automobile wheels by model and type, such that multiple wheels of the same model and type are grouped together, for example to form a complete set of wheels for a given type of automobile.

In light of the above, a system and method for recovering high purity aluminum alloy wheels from the remainder of a supply of used automobile wheels, and for further identifying wheel types and models of reusable wheels from the recovered high purity aluminum alloy wheels, is desired.

BRIEF SUMMARY OF THE INVENTIVE CONCEPT

The present general inventive concept provides a system for processing core wheels comprising a sorting station to allow sorting of a source of wheels according to a first set of criteria, a conveyor to receive wheels conforming to the first set of criteria and to direct the received wheels toward the discharge end of the conveyor, a first inspection station along the conveyor to allow examination of the wheels to determine whether the wheels conform to a second set of criteria, a diverter mechanism along the conveyor to divert wheels conforming to the second set of criteria from the first conveyor onto a second conveyor; and a second conveyor to receive the diverted wheels and direct the diverted wheels to a second inspection station for inspection to confirm that the diverted wheels conform to the second set of criteria.

The first inspection station of the system may include a camera to capture images of wheels carried along the conveyor.

The first inspection station of the system may include a monitor in communication with the camera to display images captured by the camera.

The first inspection station of the system may include a control mechanism in operational communication with the diverter mechanism allowing a user to divert wheels conforming to the set of criteria from the first conveyor to the second conveyor in response to images displayed by the monitor.

The first inspection station of the system may include a control module in operational communication with the camera and the diverter mechanism, with said control module having a computer, integrated into or otherwise in communication with the control module, and computer software capable of processing the image of the wheel received from the camera, finding potential matches of said image with images of known wheels stored in a wheel feature database, comparing the potential wheel matches to a buy list and other business criteria, making a decision whether or not to keep the wheel, and triggering the diverter mechanism for wheels selected to be kept.

The first inspection station of the system may include a wheel sensor in operational communication with the control module to notify the control module that a wheel is approaching the camera, with the control module also in operational control of the camera, the diverter mechanism and the motors of the conveyors, thus automating the operation of the first inspection station and the operation of the diverter mechanism by transporting the wheels at equal intervals on the conveyors and signaling the diverter mechanism to activate when a selected wheel moves in front of the diverter mechanism.

The system may include additional conveyors with, for example, a first conveyor controlled by the control module and configured to receive incoming wheels, a second conveyor controlled by the control module and configured to receive equally spaced wheels from the first conveyor, a gravity powered third conveyor configured to receive wheels pushed off the second conveyor by the diverter mechanism, a fourth conveyor controlled by the control module and configured to receive wheels not diverted by the diverter mechanism, and a continuously running fifth conveyor configured to receive wheels from the discharge end of the fourth conveyor.

The control module of the system may include a computer and computer software designed to receive, process and store wheel images and features of known wheels with unique identifying numbers to populate a wheel feature database for known wheels. The computer software may also be designed to build and store a K-nearest neighbor classifier for subsequent matching.

The computer integrated into or in communication with the control module of the system may also include computer software designed to receive and process unknown wheel images received from the camera and to compare the images and features of the unknown wheel to images and features of the known wheels stored in the wheel feature database and to generate potential known wheel matches for the unknown wheel.

The computer integrated into or in communication with the control module of the system may also include computer software designed to compare the potential matches for an incoming wheel to a buy list and other business criteria and make a decision whether or not to keep the incoming wheel.

The image processing portion of the computer software for the computer integrated into or in communication with the control module may also include subroutines designed to analyze the image of a wheel, to determine the wheel boundary and the center of the wheel, to compute Fourier transform magnitudes of sampled points on multiple circles around the center of said wheel, and to generate features of said wheel from the image of said wheel. The computer software may also compare the features of an unknown wheel with the features of known wheels by applying the K-nearest neighbor classifier to the features of the unknown wheel to determine the nearest potential matches of the unknown wheel with known wheels in the wheel feature database. The computer software may also determine the relative closeness of each match potential match by calculating the distance of the features of the wheel that is a potential match from the features of the unknown wheel.

The system may include a first storage container positioned proximate the second inspection station to receive wheels conforming to both the first and second sets of criteria.

The system may include a second storage container positioned proximate the discharge end of the first conveyor to receive wheels conforming to the first set of criteria but failing the second set of criteria.

The system may include additional conveyors and components with, for example, a zoned accumulation first conveyor controlled by the control module and configured to receive incoming wheels, a second conveyor controlled by the control module and configured to receive a wheel from the first conveyor and transport the wheel under the camera, a third conveyor controlled by the control module and configured to receive the wheel from the second conveyor, a gravity powered fourth conveyor configured to receive wheels pushed off the third conveyor by the diverter mechanism, a fifth conveyor controlled by the control module and configured to receive equally spaced wheels not diverted by the diverter mechanism and transport them through a cleaning station, a zoned accumulation sixth conveyor configured to receive wheels from the fifth conveyor and accumulate wheels while they are loaded onto pallets, a gravity powered seventh conveyor deck attached to a hydraulic scissor lift and configured to hold a pallet while wheels are loaded onto a pallet and wrapped for shipping, and a zoned accumulating eighth conveyor configured to receive wrapped pallets of wheels from the seventh conveyor deck and accumulate pallets awaiting removal by a fork lift.

The system may include an infrared sensor configured to measure the height and width of a wheel and to communicate the measurements to the control module for storage in the wheel feature database.

The present general inventive concept provides a method for processing core wheels comprising providing a supply of wheels to a first location, sorting the wheels to separate at least a first portion of the wheels conforming to a first set of criteria from the supply of wheels, transporting the first portion of the wheel supply to a second location, separating a second portion of the wheels conforming to a second set of criteria from the first portion of the wheels, transporting the second portion of the wheels to a third location, verifying conformity of the second portion of the wheels to the second set of criteria, and transporting the remainder of the first portion of the wheels to a fourth location.

The method may include first criteria that selects only wheels that are not chrome plated and not used for semi-trailer trucks.

The method may include first criteria that selects only wheels that are fabricated from aluminum alloy.

The method may include second criteria that selects only wheels that are not too badly worn or damaged and that are capable of being used with specific makes and/or models of automobiles.

The method may include the operation of separating a second portion of the wheels conforming to a second set of criteria and performing a visual inspection of the first portion of the wheels during transportation to the second location.

The method may include the visual inspection being performed using a camera to capture images of the first portion of the wheels during the transportation operation.

The method may include the operation of separating a second portion of the wheels conforming to a second set of criteria further by, for example, actuating a sensor arm to divert wheels conforming to the second set of criteria for transportation to the third location.

The method may include the operation of receiving images of known wheels having unique identifying numbers from third parties, processing the images of the wheels to determine the features of the wheels, and storing the features of the wheels in a wheel feature database together with the unique identifying numbers. The method may include the operation of analyzing the digital image of an unknown wheel, determining the wheel boundary and the center of the wheel, sampling sampled points on multiple circles around the center of the wheel, and computing Fourier transform magnitudes of sampled points on multiple circles to generate features of the wheel. The method may also include the operation of building and storing a K-nearest neighbor classifier for subsequent matching.

The method may include the operation of comparing the features of an unknown wheel to features of known wheels stored in the wheel feature database. The method may include the operation of analyzing the digital image of the unknown wheel, determining the wheel boundary and the center of the wheel, sampling sampled points on multiple circles around the center of the wheel, and computing Fourier transform magnitudes of sampled points on multiple circles to generate features of the wheel. The method may also include the operation of applying the K-nearest neighbor classifier to the features of the unknown wheel to determine the nearest matches of the unknown wheel with known wheels in the wheel feature database. The method may also include the operation of determining the relative closeness of each match potential match by calculating the distance of the features of the wheel that is a potential match from the features of the unknown wheel.

The method may include the operation of comparing wheels that potentially match known wheels with wheels on a buy list and other desirable wheels based on other business criteria.

The method may include the operation of cleaning the wheels that do not meet all of the matching criteria.

The method may include the automation of the operation of the first inspection station and the operation of the diverter mechanism comprising a control module in operational control of the wheel sensor, the camera, the diverter mechanism and the motors of the conveyors to transport the wheels at equal intervals on the conveyor to the diverter mechanism and activating the diverter mechanism when a selected wheel moves in front of the diverter mechanism.

The method may include the operation of positioning a source of wheels meeting the first set of criteria for loading onto the receiving end of the first conveyor.

The method may include the operation of taking measurements of the wheel and storing the measurements of the wheel in the wheel feature database to limit the number of known wheels to be compared to an unknown wheel in the wheel matching process.

The method may include the operation of raising a pallet to the level of the conveyor for the incoming wheels, sequentially lowering the pallet to the level of the incoming conveyor as the loading of each layer of wheels is completed, and raising the level of the pallet to the level of the outgoing conveyor once the pallet is fully loaded.

The method may include the operation of securing layers of wheels to a pallet by wrapping multiple layers of wheels in overlapping wrapping material as the wheels are loaded onto the pallet.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
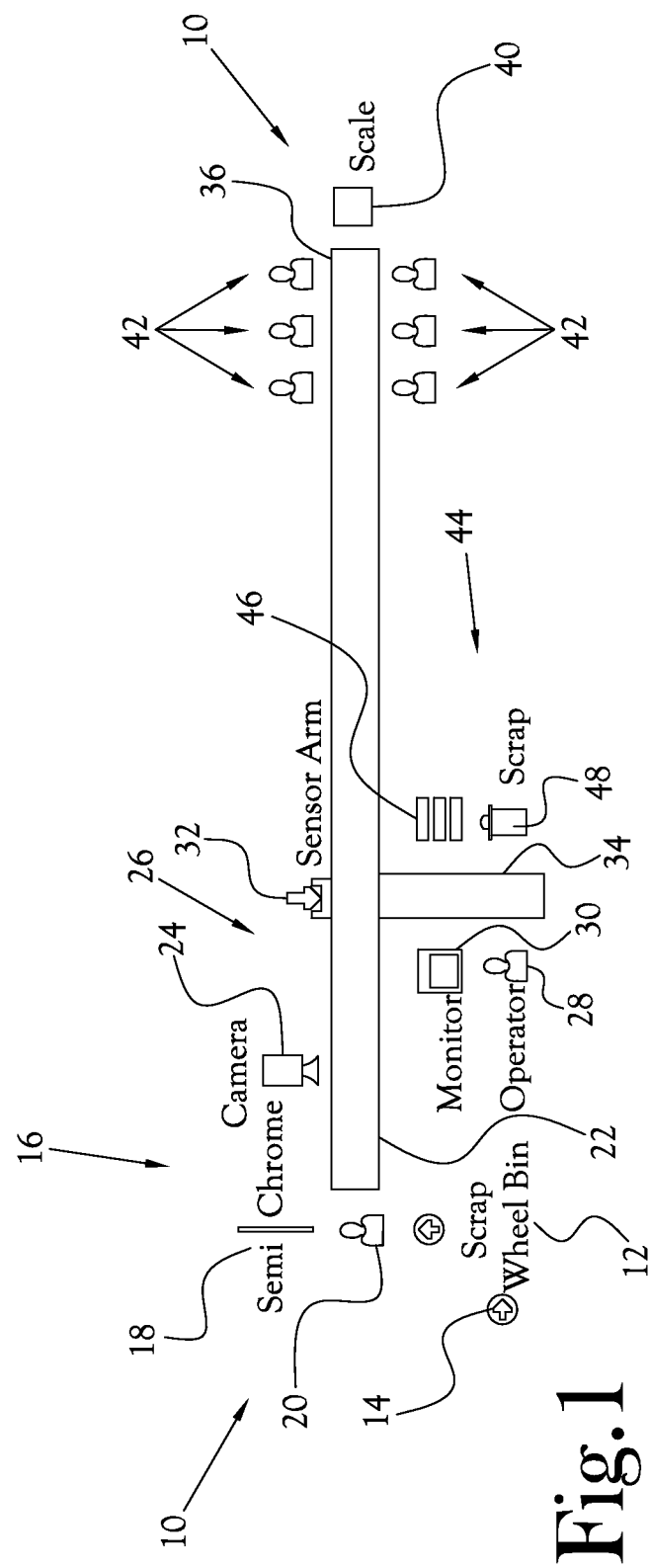
FIG. 1 is a schematic representation of an example embodiment of a core wheel processing system according to several features of the present general inventive concept.

FIG. 1 illustrates a schematic representation of an example embodiment of a core wheel processing system and method according to several features of the present general inventive concept. The core wheel processing system and method, or system, is identified as 10 herein and in the accompanying figures.

With initial reference to FIG. 1, in one embodiment of a system 10 according to several features of the present general inventive concept, a supply of wheels, such as for example used or scrap wheels, is delivered 14 to a wheel bin 12. Thereafter, an initial sorting operation 16 is performed. In several embodiments, the initial sorting operation 16 is configured to separate at least a first portion of the wheel supply, conforming to a first set of criteria for acceptable or unacceptable wheels, from at least a second portion of the wheel supply which fails the first set of criteria. For example, in the illustrated embodiment, the first set of criteria may be the unacceptability of chrome-plated wheels and/or wheels used for semi-trailer trucks. In this embodiment, the initial sorting operation 16 includes separation of chrome-plated wheels and wheels used for semi-trailer trucks 18 from a remainder of the supply of wheels. The separated chrome-plated wheels and wheels used for semi-trailer trucks 18 may, in certain embodiments be discarded following the initial sorting operation 16. In other embodiments, the chrome-plated wheels and wheels used for semi-trailer trucks 18 may, following the initial sorting operation 16, be directed for further processing, such as for example for processing in a recycling or other reclamation process. In some embodiments, the initial sorting operation 16 may be performed by a first operator 20 by visually inspecting and manually separating the first portion of the wheel supply from a remainder of the wheel supply. However, those skilled in the art will recognize other suitable devices and operations by which the initial sorting operation 16 may be performed, and such other devices and operations may be used without departing from the spirit and scope of the present general inventive concept.

Following the initial sorting operation 16, the remainder of the supply of wheels which were not separated into the first portion during the initial sorting operation 16 (hereinafter, the "wheels") may be placed onto a first conveyor 22. The first conveyor 22 is configured to transport the wheels to a second sorting operation 26, whereby at least a portion of the wheels, which conform to a second set of criteria for acceptable or unacceptable wheels, are separated from the remainder of the wheels which fail the second set of criteria. For example, in several embodiments, a second set of criteria is established wherein wheels which are not too badly worn or damaged and which are capable of being used with particular makes and/or models of automobiles are deemed acceptable. It will be understood that the specific terms of the second set of criteria, such as for example the particular makes and/or models of automobiles matching the second set of criteria or the degree to which a wheel may be damaged and/or worn without failing the second set of criteria, may depend upon the specific needs and/or capabilities of the users of the system 10, and as such may vary without departing from the spirit and scope of the present general inventive concept. For example, as will be discussed in further detail below, in several embodiments, the second sorting operation 26 includes a high-speed comparison of an image of each wheel to images of wheels from a database. In certain of these embodiments, wheels conforming to one or more image of an acceptable wheel from the database may be separated from the remainder of the wheels. In certain embodiments, the database and/or the second set of criteria for acceptable wheels is updatable.

In the illustrated embodiment, the second sorting operation 26 includes transportation of the wheels via the first conveyor 22 to a first inspection station 24 for inspection. In the illustrated embodiment, the first inspection station comprises a camera 24 which is directed toward a carrying surface of the first conveyor 22, such that the camera 24 may capture images of the wheels as they pass by the camera 24 on the first conveyor 22. For each wheel for which an image is captured by the camera 24, an image of the wheel is examined to determine whether the wheel conforms to, or fails, the second set of criteria. For example, in several embodiments, each image of the wheel is subjected to a high-speed comparison to a database of wheel images using image processing techniques to determine whether the wheel captured by the camera 24 conforms to the characteristics of a known wheel type in the database. In one such embodiment, the camera 24 is in communication with a microprocessor such that the microprocessor may receive captured images from the camera 24. The microprocessor is, in turn, in communication with a data storage device. A database of images of wheels is stored on the data storage device, with each stored wheel image having one or more feature vectors associated therewith. The feature vectors associated with the stored wheel images correlate to features of the wheel shown in the stored wheel image. Upon capturing an image of a wheel passing by the camera 24, the captured image may be received by the microprocessor from the camera 24. Thereafter, the microprocessor may extract and/or compute one or more feature vectors from the captured image which correlate to features of the wheel shown in the captured image. The microprocessor may then compare the feature vectors from the captured image with feature vectors of the stored wheel images in the database, such that the microprocessor may identify one or more relevant stored wheel images from the database showing wheels with features similar to features of the wheel in the captured image.

In several embodiments, each wheel image stored in the database further includes data corresponding to an identification of the type of wheel shown in the stored image, such as for example the year, make, model and/or type of wheel, or a part number or reference number corresponding to the particular wheel. Each wheel image stored in the database may further include data indicating whether the particular type of wheel shown in the stored image conforms to the second set of criteria used for the second sorting operation 26. Thus, by determining whether the wheel shown in the image captured by the camera 24 conforms to the features of any of the stored wheel images in the database, and by determining for each stored wheel image conforming to the captured image whether the stored wheel image conforms to the second set of criteria, the microprocessor may determine whether the wheel shown in the captured images conforms to, or fails, the second set of criteria. In several embodiments, the data indicating whether the particular type of wheel shown in the stored image conforms to the second set of criteria is updatable. For example, in some embodiments, the data storage device includes an input for receiving updated data as to which types of wheels and/or which of the stored images conforms to the second set of criteria. In certain more discreet embodiments, such updated data is provided on a set schedule, such as for example weekly. Thus, the system 10 may be used, for example, to identify wheels conforming to a list of wheel types needed to fill a particular order. However, those of skill in the art will recognize other configurations for the data storage device which may be used without departing from the spirit and scope of the present general inventive concept.

In some embodiments, the microprocessor is configured to perform a comparison of the features of the captured image versus the features of the stored images to determine whether the wheel in the captured image is identical, or substantially identical, to any of the wheels shown in the stored images. However, in other embodiments, the microprocessor is configured to determine whether the wheel in the captured image is sufficiently similar to any of the wheels shown in the stored images to warrant further examination. For example, in one embodiment, the microprocessor is configured to compare only features of the outer portions of the wheel, and to disregard portions of the wheel near the central axis of the wheel. Thus, in this embodiment, the system 10 is configured such that the second sorting operation 26 may take into account the possibility that the wheel may or may not include a center cap, hub cap, or the like, and does not perform a determination of conformity to the second set of criteria based on a visual inspection of the central portions of the wheel. In another embodiment, the microprocessor is configured to determine whether the wheel shown in the image captured by the camera 24 conforms to any of the stored wheel images in the database based on similarities in only a portion of the corresponding feature vectors of the captured image and the stored wheel images. Thus, in this embodiment, the system 10 is configured such that wheels containing minor defects and/or imperfections may still be identified as conforming to the second set of criteria.

In another embodiment, inspection of each captured image is performed manually by a second operator 28. More specifically, in some embodiments, the camera 24 is provided in communication with a monitor 30, such that images captured by the camera 24 are displayed on the monitor 30 for viewing by the second operator 28. Thus, the second operator 28 is able to view the images of the wheels displayed on the monitor 30 and determine whether each of the wheels depicted in the images conforms to, or fails, the second set of criteria. Those of skill in the art will recognize other means by which the second sorting operation 26 may be performed, and such other means may be used without departing from the spirit and scope of the present general inventive concept.

In several embodiments, the system 10 includes suitable apparatus positioned downstream of the first inspection station 24 such that, once a determination is made as to whether each of the wheels conforms to, or fails, the second set of criteria, those wheels which conform to the second set of criteria may be separated from those wheels which fail the second set of criteria. For example, in the illustrated embodiment, a sensor arm 32 is provided along the first conveyor 22 and is capable of directing selected wheels from the first conveyor 22 to a second conveyor 34. In several embodiments, the sensor arm 32 is selectively movable between a first position and a second position. In the first position, the sensor arm 32 permits wheels on the first conveyor 22 to continue travelling along the first conveyor 22 beyond the sensor arm 32. In the second position, the sensor arm 32 diverts wheels from the first conveyor 22 and directs the diverted wheels onto the second conveyor 34. In the illustrated embodiment, the sensor arm 32 is in operative communication with a suitable control mechanism, such as for example a switch, lever, or other suitable device, in communication with the microprocessor, which allows the sensor arm 32 to be moved between the first and second position in response to determinations of conformity to the second set of criteria by the microprocessor. Thus, upon determining whether each wheel passing the camera conforms to or fails the second criteria, the sensor arm 32 may be moved between the first and second position to direct each wheel to one of the first and second conveyors 22, 34 based on such determination.

In other embodiments, the camera 24 is provided in operative communication with a computer (not shown) having appropriate image recognition software, of the type known to one of skill in the art, such that the computer is able to analyze an image provided by the camera 24 and determine whether a wheel depicted in the image conforms to, or fails, the second set of criteria. Upon a determination that the wheel depicted in the image conforms to the second criteria, a signal is generated. In certain embodiments, the sensor arm 32 is configured to be responsive to the signal such that, upon receipt of the signal, the sensor arm 32 is moved between the first and second position. Thus, in these embodiments, the camera 24, computer, and sensor arm 32 cooperate to automatically direct each wheel to one of the first and second conveyors 22, 34 based on the determination of the computer.

As discussed above, in several embodiments, the second criteria is established such that wheels which are not too badly worn or damaged and which sufficiently conform to particular makes and/or types of wheels as determined by the database comparison are deemed acceptable. In certain of these embodiments, operation of the sensor arm 32 is performed such that acceptable wheels, according to the second criteria, are directed onto the second conveyor 34, while unacceptable wheels, according to the second criteria, are allowed to continue on the first conveyor 22. The first conveyor 22 carries the unacceptable wheels to a discharge end 36 of the first conveyor 22, whereupon the unacceptable wheels may be loaded onto one or more weigh scales 40, or other suitable holding apparatus, for further processing, such as for example for processing in a recycling or other reclamation process. In the illustrated embodiment, the unacceptable wheels are removed from the discharge end 36 of the first conveyor 22 and loaded onto the weigh scale 40 manually by a plurality of third operators 42. In certain embodiments, additional sorting of the unacceptable wheels based on additional criteria for recyclability may occur. In another embodiment, the discharge end 36 of the first conveyor 22 empties into the weigh scale 40, such that no additional individual handling of the unacceptable wheels is necessary.

As discussed above, operation of the sensor arm 32 is performed such that acceptable wheels, which in the present embodiment are wheels which sufficiently conform to particular makes and/or types of wheels as determined by the database comparison, are directed onto the second conveyor 34. The second conveyor 34 transports the acceptable wheels to a final inspection and loading station 44, whereupon the acceptable wheels may be subjected to a final inspection and loaded onto one of a plurality of suitable holding devices for transportation to a secondary location for refurbishment, as needed, before being directed toward reuse. In one embodiment, the final inspection operation includes placing the wheel on a suitable apparatus whereby a visual inspection of the wheel may be made. For example, in one embodiment, the final inspection operation includes placing the wheel on a rotatable mount and rotating the wheel. As the wheel is rotated on the rotatable mount, the wheel may be visually inspected by the second operator 28 to confirm that the wheel is acceptable for refurbishment and/or reuse. Upon passing the final inspection, the wheel may be loaded onto at least one core skid 46 for transportation to the secondary location. If the wheel fails to pass the final inspection, it may be placed in a scrap container 48 and discarded. In the illustrated embodiment, the system 10 is configured such that the final inspection and loading station 44 is operated by the second operator 28. However, those of skill in the art will recognize other configurations suitable for operation of the final inspection and loading station 44, and such other configurations may be used without departing from the spirit and scope of the present general inventive concept.

In several embodiments, the system 10 is configured to allow additional sorting of wheels which pass the final inspection, for example, into groups of wheels the sum of which meet an additional criteria, such as to fill a particular order or request for a particular number and/or type of wheels. For example, in one embodiment, a plurality of core skids 46 are provided, with each core skid 46 corresponding to an order for a complete set of usable and/or refurbishable wheels for a particular automobile. In this embodiment, the second set of criteria may be established wherein acceptable wheels are those wheels which are capable of being reused or refurbished and which also correspond to one of the desired types of wheels needed to complete at least one of the orders corresponding to the core skids 46. Upon completion of an order via loading the acceptable number and type of wheels onto the appropriate core skid 46, the completed core skid 46 may be transported to a secondary location, such as for example to a location where refurbishing of the wheels may occur or directly to a customer.

Figure 2:
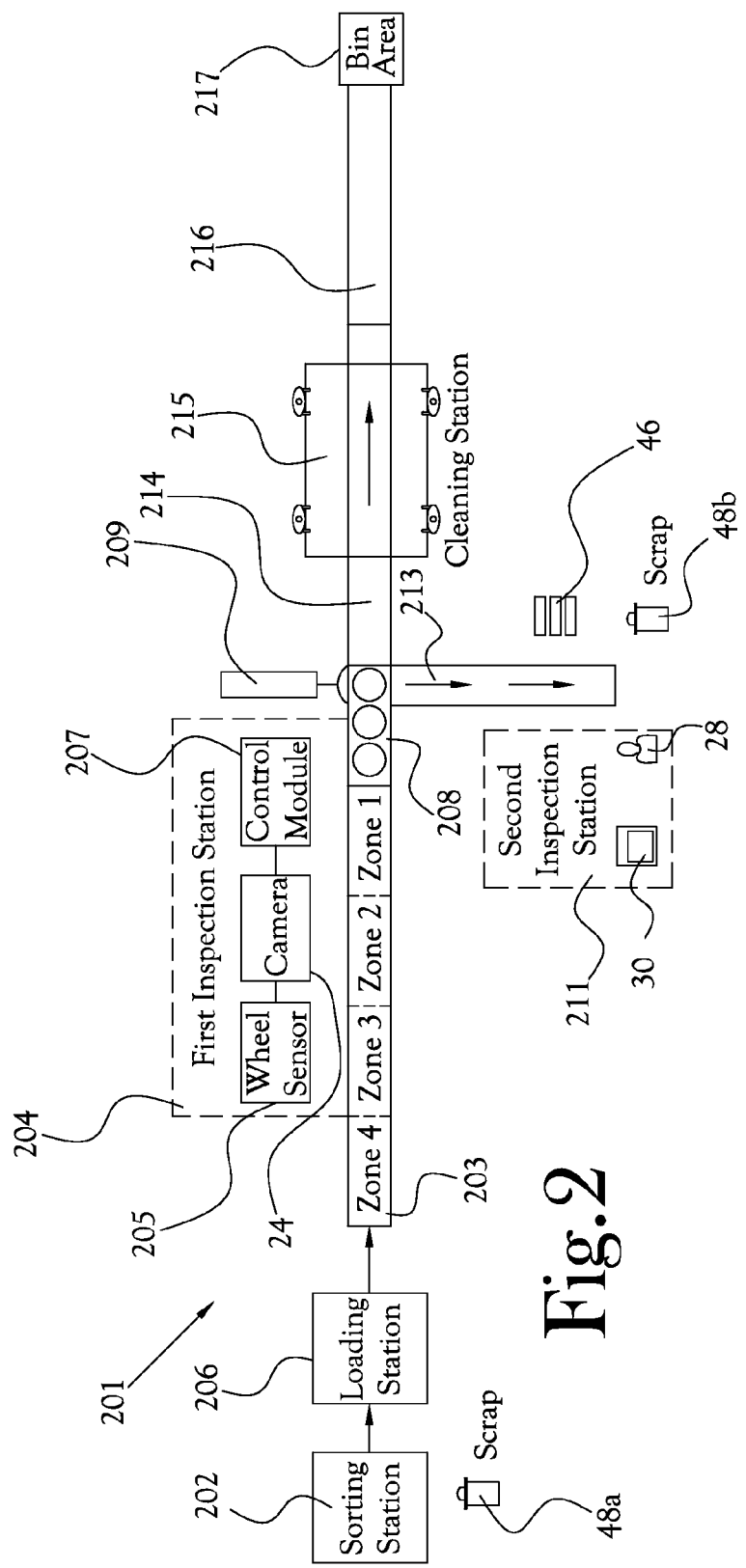
FIG. 2 is a schematic representation of another example embodiment of a core wheel processing system according to several features of the present general inventive concept.

FIG. 2 is a schematic illustration of another embodiment of a system 201 constructed in accordance with several features of the present general inventive concept. In the embodiment of FIG. 2, the system 201 includes a sorting station 202 which is configured to allow initial sorting of a source of wheels according to a first set of criteria, with wheels not matching the first set of criteria being placed in a first scrap receptacle 48a. A loading station 206 is provided, which is configured to allow placement of each wheel matching the first set of criteria onto a first conveyor 203. The first conveyor 203 is configured to receive incoming wheels, to convey the incoming wheels to a location for examination of the wheels for sorting according to a second set of criteria, and to discharge the wheels evenly spaced onto a second conveyor 208.

Referring to the example embodiment illustrated in FIG. 2, the first conveyor 203 defines a plurality of regions, or "zones," along the length thereof for positioning and accumulation of incoming wheels for sorting according to the second set of criteria. In one embodiment, a first inspection station 204 is disposed along the first conveyor 203 proximate two of the plurality of zones, identified as "zone 1" and "zone 2" in FIG. 2. The first inspection station 204 is equipped with a wheel sensor 205 disposed along the first conveyor 203 to detect a wheel moving from the loading station 206 into zone 2 of the first conveyor 203. The first inspection station 204 is further equipped with a camera 24 in operative communication with the wheel sensor 205 and configured to view objects positioned at zone 1 on the first conveyor 203.

In the example embodiment illustrated in FIG. 2, upon detection of a wheel at a location along the first conveyor 203 proximate zone 2, the wheel sensor 205 is configured to signal a control module 207, whereupon the control module 207 is configured to stop the first conveyor 203 with the wheel in zone 2. The control module 207 may then signal the first conveyor 203 to move the incoming wheel into zone 1 of the first conveyor 203. The camera 24 disposed above zone 1 of the first conveyor 203 may then be signaled to capture an image of the wheel and to communicate the image to the control module 207. The control module 207 may then signal the first conveyor 203 to start and move the wheel to the discharge end of the first conveyor 203. As will be further discussed hereinbelow, the camera 24 is in communication with a computer processing device which is configured to identify the wheel imaged by the camera 24 and to compare the identified wheel to a second set of criteria to determine if the wheel is to be kept.

A second conveyor 208 is provided which is configured to receive a plurality of evenly spaced wheels discharged by the first conveyor 203. The second conveyor 208 is configured to direct the received wheels to a diverter mechanism 209, whereupon the diverter mechanism 209 may divert wheels conforming to the second set of criteria from the second conveyor 208 onto the third conveyor 213. In several embodiments, the diverter mechanism 209 comprises a piston, lever arm, or other such device. However, those of skill in the art will recognize other suitable devices which may be used to accomplish the operation performed by the diverter mechanism 209 without departing from the spirit and scope of the present general inventive concept. In several embodiments, the second conveyor 208 maintains the spacing of the received wheels along a length of the second conveyor 208 in order to assist in timing of the diverter mechanism 209.

In the example embodiment illustrated in FIG. 2, the third conveyor 213 is configured to receive the diverted wheels and to direct the diverted wheels to a second inspection station 211. The second inspection station 211 is disposed along the third conveyor 213 and is configured to allow examination of the diverted wheels by an operator 28. At the second inspection station 211, the operator 28 may confirm whether each wheel conforms to the second set of criteria. Wheels conforming to the second set of criteria may be placed onto a core skid 46, and wheels not conforming to the second set of criteria may be placed in a second scrap receptacle 48b and discarded.

Those wheels not diverted by the diverter mechanism 209 are carried by the second conveyor 208 to a discharge end of the second conveyor 208. A fourth conveyor 214 is provided to receive the wheels from the discharge end of the second conveyor 208 and to direct the received wheels through a cleaning station 215 and on to the discharge end of the fourth conveyor 214. The cleaning station 215 is configured to manipulate and clean the wheels prior to the wheels being discharged onto a fifth conveyor 216. A fifth conveyor 216 is configured to receive the clean wheels discharged from the fourth conveyor 214 and to direct them into a bin area 217.

In the example embodiment illustrated in FIG. 2, the first conveyor 203, second conveyor 208, and fourth conveyor 214 are each electronically controlled by the control module 207, which is also in operative communication with the wheel sensor 205. Thus, the control module 207 may signal each conveyor to advance as needed to maintain sufficient pace and spacing of wheels along the first, second, and fourth conveyors 203, 208, 214. In the illustrated embodiment, the fifth conveyor 216 is configured to run continuously, while the third conveyor 213 is a gravity-driven conveyor, such as for example a ramp or other suitable device. However, those of skill in the art will recognize other means for controlling the various conveyors 203, 208, 213, 214 which may be used without departing from the spirit and scope of the present general inventive concept. For example, in other embodiments, the third conveyor 213 may be powered by automated means known to those of skill in the art.

In the example embodiment illustrated in FIG. 2, the control module 207 is in communication with a computer (not shown), with said computer having appropriate image recognition software, of the type known to one skilled in the art, such that the computer is able to analyze an image provided by the camera 24, identify the closest matches to the imaged wheel from a wheel feature database stored in the computer, and determine whether the wheel depicted in the image conforms to, or fails, the second set of criteria. Upon a determination that the wheel depicted in the image conforms to the second set of criteria, a signal is generated by the control module 207 and communicated to the diverter mechanism 209 in cooperation with the movement of the wheel along the second conveyor 208 and the arrival of the wheel in front of the diverter mechanism 209. In the embodiments illustrated in FIG. 2, the diverter mechanism 209 is configured to be responsive to the signal such that, upon receipt of the signal, the diverter mechanism 209 is activated to push the wheel from the second conveyor 208 onto the third conveyor 213. Thus, in this embodiment, the camera 24, the computer in the control module 207, the second conveyor 208, and the diverter mechanism 209 work in cooperation with one another to automatically direct each wheel either to the third conveyor 213 for confirmation by the operator 28 or to the discharge end of the second conveyor 208 based on the determination of the computer integrated into or otherwise in communication with the control module 207.

Figure 3:
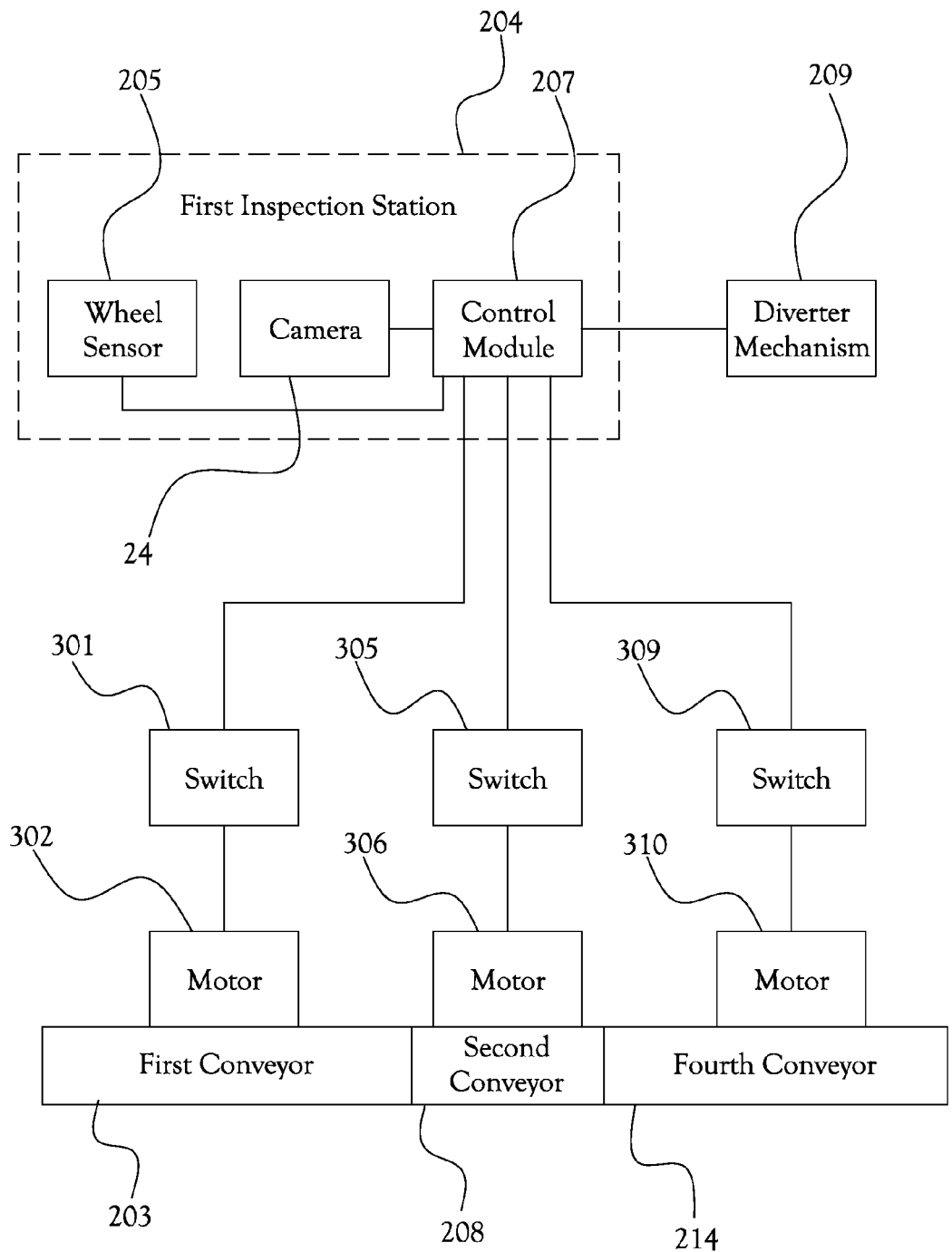
FIG. 3 is a diagram illustrating one example embodiment of the first inspection station showing the control module in operative communication with the wheel sensor and in operative control of the camera, the diverter mechanism, the switch of the first conveyor motor, the switch of the second conveyor motor, and the switch of the fourth conveyor motor in the example embodiment of the core wheel processing system illustrated in FIG. 2.

In some embodiments, the first inspection station 204 is automated to control the movement of the first conveyor 203, the second conveyor 208, and the fourth conveyor 214, so that the wheels are evenly spaced as they pass in front of the diverter mechanism 209. Referring now to FIG. 2 and FIG. 3, the wheel sensor 205 initiates a signal to the control module 207 when a wheel is approaching the camera 24, and in response to the signal, the control module 207 stops the first conveyor 203 with the wheel in zone 2 of the first conveyor 203. After the control module 207 determines that the diverter mechanism 209 is no longer in a push cycle, the control module 207 signals a switch 301 to start a motor 302 to propel the first conveyor 203 to a point where the wheel is position in zone 1 of the first conveyor 203 under the camera 24, signals the camera 24 to capture the image of the wheel, and then signals the switch 301 to start the motor 302 to advance the first conveyor 203 to run until the next incoming wheel is detected by the wheel sensor 205. When the first conveyor 203 has moved the distance required to discharge the wheel onto the second conveyor 208, the control module 207 signals a switch 305 to start a motor 306 and advance the second conveyor 208 a set distance. If the second conveyor 208 discharged a wheel onto the fourth conveyor 214, the control module 207 also signals a switch 309 to start a motor 310 and advance the third conveyor 214 the same set distance. In some embodiments, the second conveyor 208 and the fourth conveyor 214 are each advanced thirty-four (34) inches each time they are advanced so that the wheels remain evenly spaced on the second conveyor 208 as they move in front of the diverter mechanism 209 and remain evenly spaced on the fourth conveyor 214 as they move into the cleaning station 215. This equal spacing of the wheels allows the control module 207 to track the location of each wheel and signal the diverter mechanism 209 to push each wheel matching the set of criteria from the second conveyor 208 onto the third conveyor 213 as the matching wheel moves in front of the diverter mechanism 209. This equal spacing of the wheels also places the wheels on the fourth conveyor 214 in the proper position for pickup and manipulation as each wheel enters the cleaning station 215. In other embodiments, a wheel sensor may be disposed at the receiving end of the fourth conveyor 214 to detect whether a wheel is present and to notify the control module not to advance the fourth conveyor 214 the set distance if no wheel is present, thus permitting the fourth conveyor 214 to maintain even spacing of wheels with no gaps where wheels have been diverted onto the third conveyor 213. One of skill in the art will understand that the above-mentioned example dimensions are not meant to be limiting, and that other values may be substituted for the set distance of thirty-four inches for advancement of the respective conveyors without departing from the scope or spirit of the present general inventive concept. Further, one of skill in the art will understand that suitable controllers may be substituted for the above-mentioned switches 302, 306, 310 without departing from the scope or spirit of the present general inventive concept.

Figure 4:
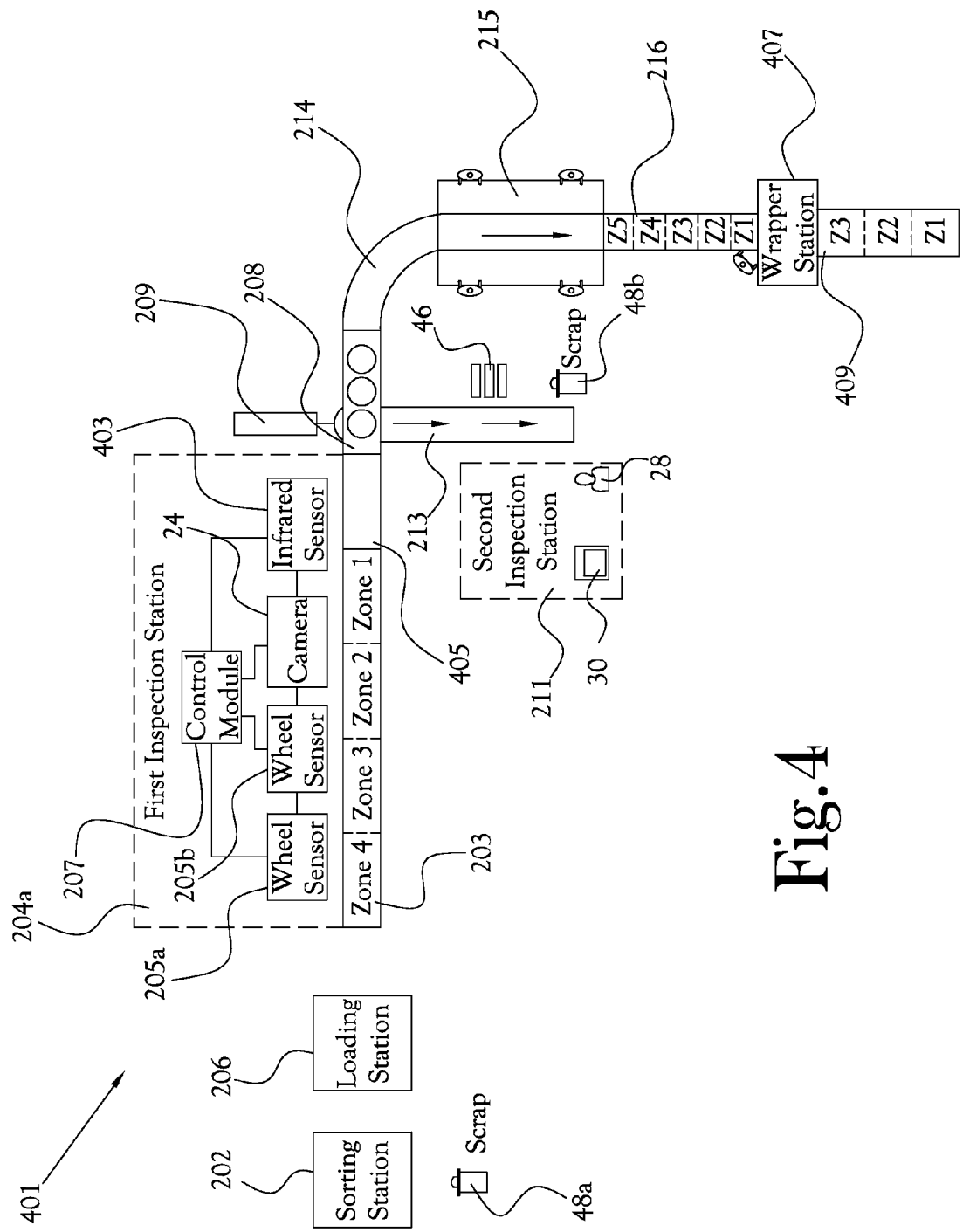
FIG. 4 is a schematic representation of another example embodiment of a core wheel processing system according to several features of the present general inventive concept.

FIG. 4 is a schematic illustration of another embodiment of a system 401 constructed in accordance with several features of the present general inventive concept. In this example embodiment, the system 401 includes a sorting station 202, a loading station 206, a first conveyor 203, a second conveyor 405, a third conveyor 208, a diverter mechanism 209, a fourth conveyor 213, a fifth conveyor 214, a cleaning station 215, a sixth conveyor 216, a wrapper station 407 with a seventh conveyor deck, an eighth conveyor, an inspection station 204a, which further includes a control module 207, a wheel sensor 205a, a wheel sensor 205b, a camera 24 and an infrared sensor 403, and a second inspection station 211, which further includes a monitor 30.

In the example embodiment illustrated in FIG. 4, the system 401 includes a sorting station 202 which is configured to allow initial sorting of a source of wheels according to a first set of criteria, with wheels not matching the first set of criteria being placed in a first scrap receptacle 48a. A loading station 206 is provided, which is configured to allow placement of each wheel matching the first set of criteria onto a first conveyor 203. In some embodiments, the loading station 206 may include a hopper above a vibrating chute, with the hopper configured for fork lift dumping of wheels into the hopper, and with the vibrating chute configured to position the wheels for loading onto the first conveyor 203.

In the example embodiment illustrated in FIG. 4, the first conveyor 203 may be a powered accumulation roller conveyor defining a plurality of regions, or "zones," along the length thereof, identified as "zone 4", "zone 3", "zone 2" and "zone 1" for positioning and accumulation of incoming wheels. The first conveyor 203 may be configured to receive incoming wheels and to accumulate the incoming wheels, with the first wheel stopping automatically in zone 1 awaiting a signal from the control module to advance the wheel onto the second conveyor 405, with other incoming wheels accumulating behind the wheel in zone 1 back in zones 2 through 4. When the control module advances the first conveyor 203 to move the wheel from zone 1 of the first conveyor 203 onto the second conveyor 405, each of the other wheels on the first conveyor 203 also advances to the next zone.

In the example embodiment illustrated in FIG. 4, the second conveyor 405 may be a powered belt conveyor controlled by the control module and configured to position each incoming wheel under the camera 24 and to discharge the wheels evenly spaced onto the third conveyor 208. The camera 24 may be disposed above the second conveyor 405 and configured to capture the image of the wheel once it is stopped on the second conveyor 405. The infrared sensor 403 may be disposed proximate to the second conveyor 405 and configured to measure the height and width of the wheel once it is stopped on the second conveyor 405.

In one embodiment, a first inspection station 204a may be disposed along the first conveyor 203 and the second conveyor 405. The control module of the first inspection station may be in operative communication with the wheel sensor 205a and the wheel sensor 205b, and the control module 207 may be in operative control of the first conveyor 203, the second conveyor 405, the camera 24, the infrared sensor 403, the third conveyor 208, the diverter mechanism 209, and the fifth conveyor 214. The first wheel sensor 205a may be disposed along the first conveyor 203 and configured to detect a wheel moving into zone 1 of the first conveyor 203 and to signal the control module 207 to stop the first conveyor 203 with the wheel in zone 1. If no wheel is present on the second conveyor 405, the control module 207 may signal the first conveyor 203 to move the wheel from zone 1 of the first conveyor 203 onto the second conveyor 405. The second wheel sensor 205b may be disposed along the second conveyor 405 and configured to detect a wheel positioned on the second conveyor 405 and to signal the control module 207 that a wheel is in position on the second conveyor 405. The control module 207 may then signal the camera 24 to capture and communicate to the control module 207 an image of the wheel located on the second conveyor 405 and may signal the infrared sensor 403 to take and communicate to the control module 207 measurements of the height and width of the wheel located on the second conveyor 405. Once the control module 207 has received the image and measurements for the wheel, the control module 207 may signal the second conveyor 405 to advance the wheel onto the third conveyor 208. As will be further discussed hereinbelow, a computer (not shown) may be integrated into or otherwise in communication with the control module 207 and may include computer software which may be configured to identify the wheel imaged by the camera 24 and to compare the identified wheel to a second set of criteria to determine if the wheel is to be kept.

In the example embodiment illustrated in FIG. 4, a third conveyor 208 may be a powered roller conveyor controlled by the control module 207 and configured to receive a plurality of evenly spaced wheels discharged by the second conveyor 405. The third conveyor 405 may be configured to direct the received wheels to a diverter mechanism 209, whereupon the diverter mechanism 209 may divert wheels conforming to the second set of criteria from the third conveyor 208 onto the fourth conveyor 213. In several embodiments, the diverter mechanism 209 comprises a piston, lever arm, or other such device. However, those of skill in the art will recognize other suitable devices which may be used to accomplish the operation performed by the diverter mechanism 209 without departing from the spirit and scope of the present general inventive concept. In several embodiments, the third conveyor 208 maintains the spacing of the received wheels along a length of the third conveyor 208 in order to assist in timing of the diverter mechanism 209.

In the example embodiment illustrated in FIG. 4, the fourth conveyor 213 may be a gravity powered wheel conveyor configured to receive the diverted wheels and to direct the diverted wheels to a second inspection station 211. The second inspection station 211 may be disposed along the fourth conveyor 213 and configured to allow examination of the diverted wheels by an operator 28. At the second inspection station 211, the operator 28 may confirm whether each wheel conforms to the second set of criteria. Wheels conforming to the second set of criteria may be placed onto a core skid 46, and wheels not conforming to the second set of criteria may be placed in a second scrap receptacle 48b and discarded.

Those wheels not diverted by the diverter mechanism 209 may be carried by the third conveyor 208 to a discharge end of the third conveyor 208. In the example embodiment illustrated in FIG. 4, a fifth conveyor 214 may be a powered roller conveyor controlled by the control module 207 and configured to receive the wheels from the discharge end of the third conveyor 208 and to direct the received wheels through a cleaning station 215 and on to the discharge end of the fifth conveyor 214. The cleaning station 215 may be configured to manipulate and clean the wheels prior to the wheels being discharged onto a sixth conveyor 216.

In the example embodiment illustrated in FIG. 4, a sixth conveyor 216 may be a powered accumulation roller conveyor defining a plurality of regions, or "zones," along the length thereof, identified as "zone 5", "zone 4", "zone 3", "zone 2" and "zone 1" for positioning and accumulation of wheels. The sixth conveyor 216 may be configured to receive the clean wheels discharged from the fifth conveyor 214, to accumulate the clean wheels, and to direct them to the wrapper station 407, with the first wheel stopping automatically in zone 1 of the sixth conveyor 216, and with other incoming clean wheels accumulating behind the wheel in zone 1, back in zones 2 through 5 of the sixth conveyor 216. When a wheel is removed from zone 1 of the sixth conveyor 216 to be loaded on a pallet, each of the other wheels on the sixth conveyor 216 automatically advances to the next zone.

In the example embodiment illustrated in FIG. 4, the wrapper station 407 may include a gravity powered seventh conveyor deck attached to a hydraulic scissor lift and configured to hold a pallet while wheels are loaded onto a pallet and wrapped for shipping by a rotating boom style wrapper disposed above and around a pallet positioned on the seventh conveyor deck of the wrapper station 407. As wheels are removed from zone 1 of the sixth conveyor 216 and loaded in layers on the pallet positioned on the seventh conveyor deck of the wrapper station 407, the scissor lift of the wrapper station 407 may be configured to lower the seventh conveyor deck of the wrapper station 407 to position the pallet for loading of each layer of wheels and then to raise the seventh conveyor deck of the wrapper station 407 to the level of the eighth conveyor 409 once it is fully loaded with wheels. As the pallet is loaded in layers, the rotating boom style wrapper may be moved around the pallet to wrap the pallet and multiple layers of the wheels on the pallet with overlapping wraps to secure the wheels to the pallet for shipping. Once the pallet is fully loaded and wrapped, the loaded and wrapped pallet may be pushed from the seventh conveyor deck of the wrapper station 407 onto the eighth conveyor 409.

In the example embodiment illustrated in FIG. 4, the eighth conveyor 409 may be a powered accumulation roller conveyor defining a plurality of regions, or "zones," along the length thereof, identified as "zone 3", "zone 2" and "zone 1" for positioning and accumulation of loaded and wrapped pallets. The eighth conveyor 409 may be configured to receive wrapped pallets of wheels from the seventh conveyor deck of the wrapper station 407 and to accumulate the pallets awaiting removal by a fork lift, with the first loaded and wrapped pallet stopping automatically in zone 1 of the eighth conveyor 409, and with subsequent loaded and wrapped pallets accumulating behind the pallet in zone 1, back in zones 2 and 3 of the eighth conveyor 409. When a loaded and wrapped pallet is removed from zone 1 of the eighth conveyor 409, each of the other pallets on the eighth conveyor 409 automatically advances to the next zone.

In the example embodiment illustrated in FIG. 4, the first conveyor 203, second conveyor 405, the third conveyor 208, and the fifth conveyor 214 are each electronically controlled by the control module 207, which is also in operative communication with the first wheel sensors 205a and the second wheel sensor 205b. Thus, the control module 207 may signal each conveyor to advance as needed to maintain sufficient pace and spacing of wheels along the second, third and fifth conveyors 405, 208, 214. In the illustrated embodiment, the fourth conveyor 213 is a gravity-driven conveyor, such as for example a ramp or other suitable device, and the first conveyor 203, the sixth conveyor 216 and the eighth conveyor 409 are powered accumulation conveyors with defined zones configured for accumulation and automatic advancement of wheels or pallets from zone to zone. However, those of skill in the art will recognize other means for controlling the various conveyors 203, 405, 208, 213, 214 which may be used without departing from the spirit and scope of the present general inventive concept. For example, in other embodiments, the third conveyor 213 and the conveyor deck of the wrapper station 407 may be powered by automated means known to those of skill in the art.

In the embodiment illustrated in FIG. 4, the control module 207 includes a computer (not shown), integrated into or otherwise in communication with the control module 207, with said computer having appropriate image recognition software, of the type known to one skilled in the art, such that the computer is able to analyze an image provided by the camera 24, identify the closest matches to the imaged wheel from a wheel feature database stored in the computer, and determine whether each potential match for the wheel depicted in the image conforms to, or fails, the second set of criteria. Upon a determination that the wheel depicted in the image conforms to the second set of criteria, a signal is generated by the control module 207 and communicated to the diverter mechanism 209 in cooperation with the movement of the wheel along the third conveyor 208 and the arrival of the wheel in front of the diverter mechanism 209. In the embodiment illustrated in FIG. 4, the diverter mechanism 209 is configured to be responsive to the signal such that, upon receipt of the signal, the diverter mechanism 209 is activated to push the wheel from the third conveyor 208 onto the fourth conveyor 213. Thus, in this embodiment, the camera 24, the computer in the control module 207, the third conveyor 208, and the diverter mechanism 209 work in cooperation with one another to automatically direct each wheel either to the fourth conveyor 213 for confirmation by the operator 28 or to the discharge end of the third conveyor 208 based on the determination of the computer integrated into or otherwise in communication with the control module 207.

Figure 5:
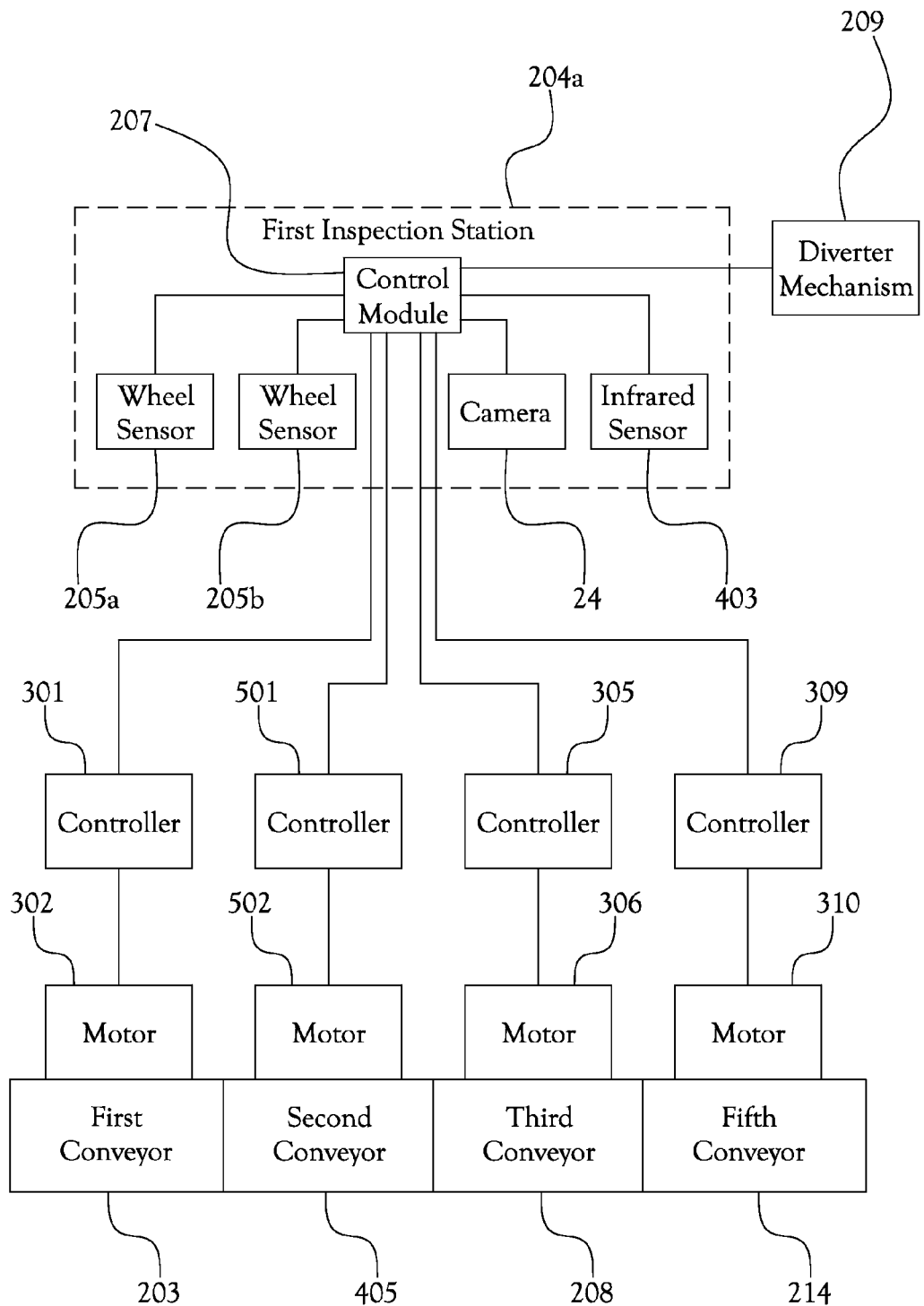
FIG. 5 is a diagram illustrating one example embodiment of the first inspection station showing the control module in operative communication with two wheel sensors and an infrared sensor and in operative control of the camera, the diverter mechanism, the controller of the first conveyor motor, the controller of the second conveyor motor, the controller of the fourth conveyor motor, and the controller of the fifth conveyor motor in the example embodiment of the core wheel processing system illustrated in FIG. 7.

In some embodiments, the first inspection station 204a is automated to control the movement of the first conveyor 203, the second conveyor 405, the third conveyor 208, and the fifth conveyor 214, so that the wheels are evenly spaced as they pass in front of the diverter mechanism 209. Referring now to FIG. 4 and FIG. 5, the wheel sensor 205a initiates a signal to the control module 207 when a wheel is approaching the camera 24, and in response to the signal, the control module 207 stops the first conveyor 203 with the wheel in zone 1 of the first conveyor 203. After the control module 207 determines that the diverter mechanism 209 is no longer in a push cycle, the control module 207 signals a controller 301 to start a motor 302 and propel the first conveyor 203 to move the wheel onto the second conveyor 405 to a point where the wheel is position on the second conveyor 405 under the camera 24, receives a signal from the second wheel sensor 205b that the wheel is in the proper position, signals the camera 24 to capture the image of the wheel, signals the infrared sensor 403 to take measurements of the height and width of the wheel, and then signals the controller 501 to start the motor 502 and advance the second conveyor 405 to move the wheel onto the third conveyor 208. When the second conveyor 405 has moved the distance required to discharge the wheel onto the third conveyor 208, the control module 207 signals a controller 305 to start a motor 306 and advance the third conveyor 208 a set distance. If the third conveyor 208 discharged a wheel onto the fifth conveyor 214, the control module 207 also signals a controller 309 to start a motor 310 and advance the fifth conveyor 214 the same set distance. In some embodiments, the third conveyor 208 and the fifth conveyor 214 are each advanced thirty-four (34) inches each time they are advanced so that the wheels remain evenly spaced on the third conveyor 208 as they move in front of the diverter mechanism 209 and remain evenly spaced on the fifth conveyor 214 as they move into the cleaning station 215. This equal spacing of the wheels allows the control module 207 to track the location of each wheel and signal the diverter mechanism 209 to push each wheel matching the set of criteria from the third conveyor 208 onto the fourth conveyor 213 as the matching wheel moves in front of the diverter mechanism 209. This equal spacing of the wheels also places the wheels on the fifth conveyor 214 in the proper position for pickup and manipulation as each wheel enters the cleaning station 215. In other embodiments, a wheel sensor may be disposed at the receiving end of the fifth conveyor 214 to detect whether a wheel is present and to notify the control module not to advance the fifth conveyor 214 the set distance if no wheel is present, thus permitting the fifth conveyor 214 to maintain even spacing of wheels with no gaps where wheels have been diverted onto the fourth conveyor 213. One of skill in the art will understand that the above-mentioned example dimensions are not meant to be limiting, and that other values may be substituted for the set distance of thirty-four inches for advancement of the respective conveyors without departing from the scope or spirit of the present general inventive concept.

Figure 6:
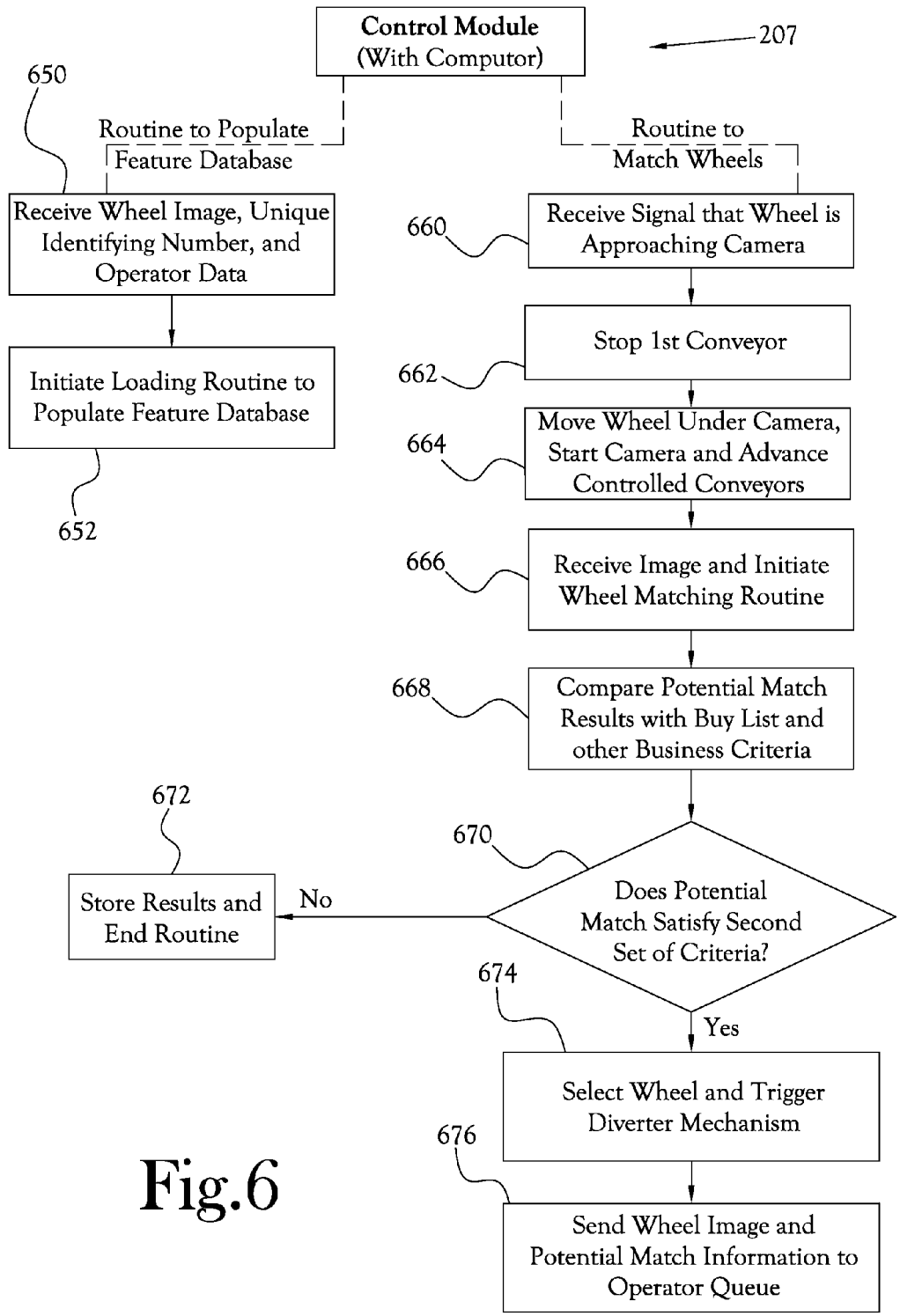
FIG. 6 is a diagram illustrating one example embodiment of the steps the control module and its computer perform in loading the wheel feature database with images of known wheels and the steps the control module and its computer perform in matching unknown wheel images to known wheel images stored in the wheel feature database.

Referring now to FIG. 6, in some embodiments, the control module 207 is configured with a computer (not shown) integrated into or otherwise in communication with the control module 207 which is capable of performing the various desired processing and control operations of the control module 207, with one such operation being a routine to populate a wheel feature database for known wheels based on digital images of known wheels.

In the embodiments illustrated in FIG. 6, the computer routine to populate a wheel feature database for known wheels includes receiving images of a known wheel 650 in the form of digital images received from third parties or from images taken by the camera 24, together with wheel data entered by an operator using a computer terminal, which data may include a unique identifying number, wheel dimensions, makes and models of automobiles using the wheel, and similar information. Once the known wheel information and image has been received by the computer, a loading routine to populate the wheel feature database is initiated 652.

Figure 7:
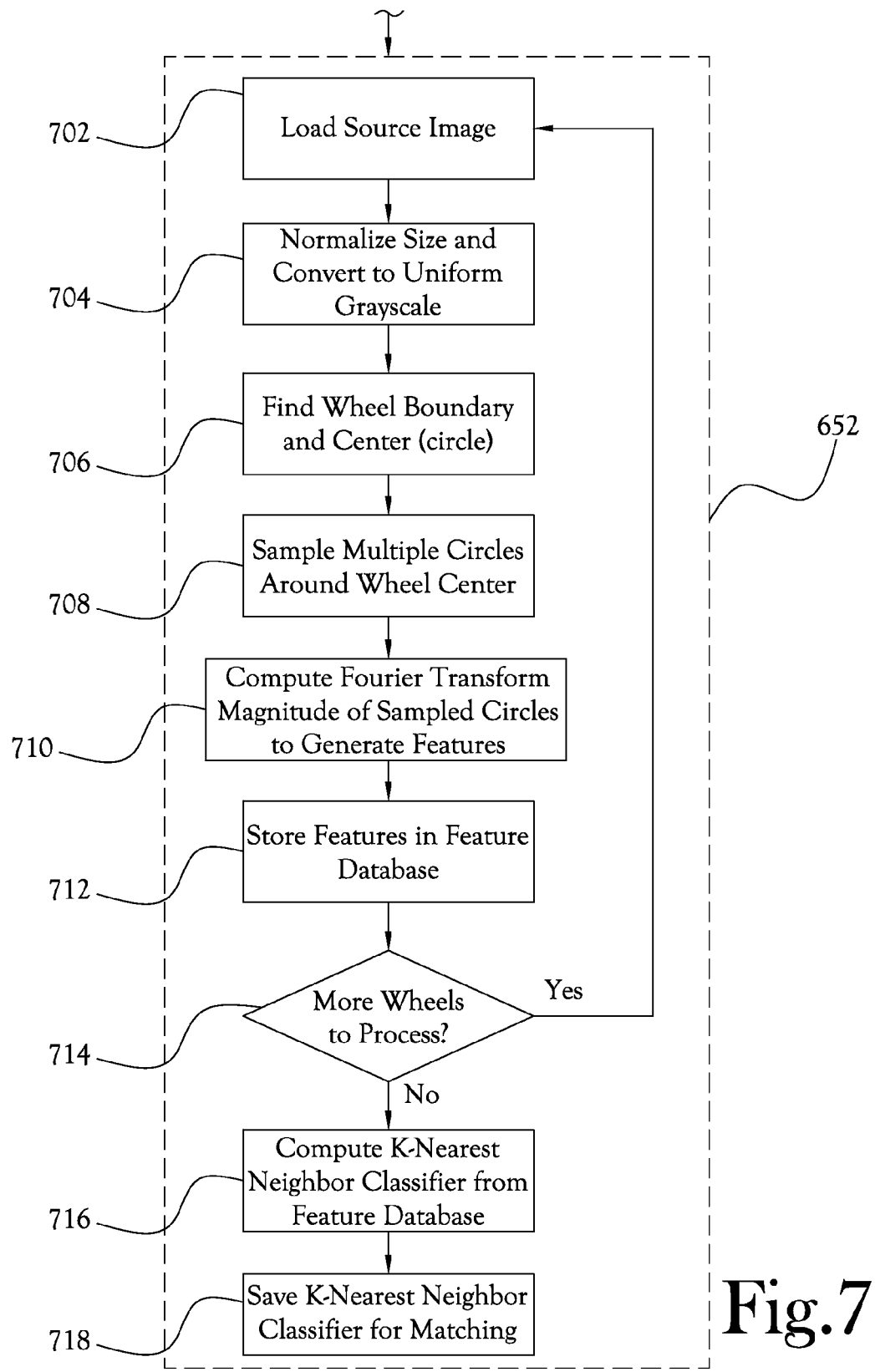
FIG. 7 is a flow diagram illustrating one example embodiment of the steps the computer software of the computer integrated into or in communication with the control module performs in loading the wheel feature database with images of known wheels.

Once the routine to populate the wheel feature database is initiated 652, the computer follows the steps set forth in the block diagram in FIG. 7. Referring now to FIG. 7, the subroutine loads the wheel image for the known wheel 702. The subroutine normalizes and converts the wheel image to uniform grayscale 704, and finds the wheel boundary and the center of the wheel 706. The subroutine samples a plurality of points on multiple circles around the wheel center 708, and computes the Fourier transform magnitudes of sampled points on multiple circles of the wheel image to generate features of the wheel 710. The subroutine stores the features of the wheel in the wheel feature database 712, and determines whether there are more wheels to process 714. If the subroutine determines that there are more wheels to process, the subroutine begins the process for the next known wheel by loading the wheel image for the next wheel 702. Once the subroutine determines there are no more wheels to process, the subroutine computes the K-nearest neighbor classifier using the features of all known wheels in the wheel feature database 716, and the subroutine saves the K-nearest neighbor classifier 718 for subsequent matching.

In some embodiments of the present inventive concept, the subroutine 710 of FIG. 7 that computes Fourier transform magnitudes of sampled points on multiple circles of the wheel image to generate features of the known wheel comprises building a matrix which stores the calculated Fourier transform magnitude for each sampled point, with the X-axis of the matrix representing the sampled circles and the Y-axis of the matrix representing the sampled points on each circle. In some embodiments of the present inventive concept, the subroutine 716 of FIG. 7 computes a K-nearest neighbor classifier using the wheel feature database.

Referring again to FIG. 6, in some embodiments, the control module 207 and its computer, integrated into or otherwise in communication with the control module 207, are capable of performing the various desired processing, matching and control operations of the control module 207, with one such operation being a wheel matching routine comprising a system and method of controlling various components of the wheel sorting system 201, 401 as unknown wheels move through the system, for the purpose of matching images of the unknown wheels with images of known wheels, identifying the closest matches to the unknown wheel, and determining which potential matches for the wheels match a second set of criteria.

Referring now to FIG. 6, as shown at 660, the wheel matching routine is initiated by the control module 207 after it receives a signal from a wheel sensor 205, 205a that a wheel is approaching the camera 24. As shown at 662, the control module 207 immediately stops conveyor 203 before the unknown wheel moves under the camera 24. As shown at 664, the control module 207 then starts conveyor 203 to direct the wheel toward the camera 24. When the wheel is under the camera 24, the control module 207 signals the camera 24 to capture the image of the wheel and signals the infrared sensor 403 to take the wheel measurements, and advances the wheel onto the next conveyor 208. The control module 207 then starts and advances conveyor 208 and conveyor 214 the same set distance, so that the wheels are evenly spaced on conveyors 208, 214, with each wheel arriving directly in front of the diverter mechanism for transfer to conveyor 213 if the wheel is selected as matching the second set of criteria. As shown at 666, the control module 207 receives the image from the camera 24 and initiates the wheel matching routine illustrated in FIG. 9 and described in more detail below. As shown at 668, the known wheels that potentially match the unknown wheel are compared to a second set of criteria, including a buy list and other business criteria previously entered into the computer, to determine if the incoming wheel is to be selected. As shown at 670, the computer of the control module 207 then determines whether each potential wheel match satisfies the second set of criteria. As shown at 674, if a potential wheel match satisfies the second set of criteria, the control module 207 triggers the diverter mechanism to push the wheel off conveyor 208 and onto conveyor 213 when the selected wheel is directly in front of the diverter mechanism 209. As shown at 676, the wheel image and potential wheel match information are sent to an operator queue for display on the monitor 30 next to the operator in the second inspection station 211. As shown at 672, if a potential wheel match does not satisfy the second set of criteria, the matching results for that wheel are stored in the computer for later display on a monitor if requested by an operator, the routine ends, and the diverter mechanism is not activated for that wheel, thus allowing it to continue to the end of conveyor 208 and onto conveyor 214 for cleaning in the cleaning station 215 and onto accumulation conveyor 216.

Figure 8:
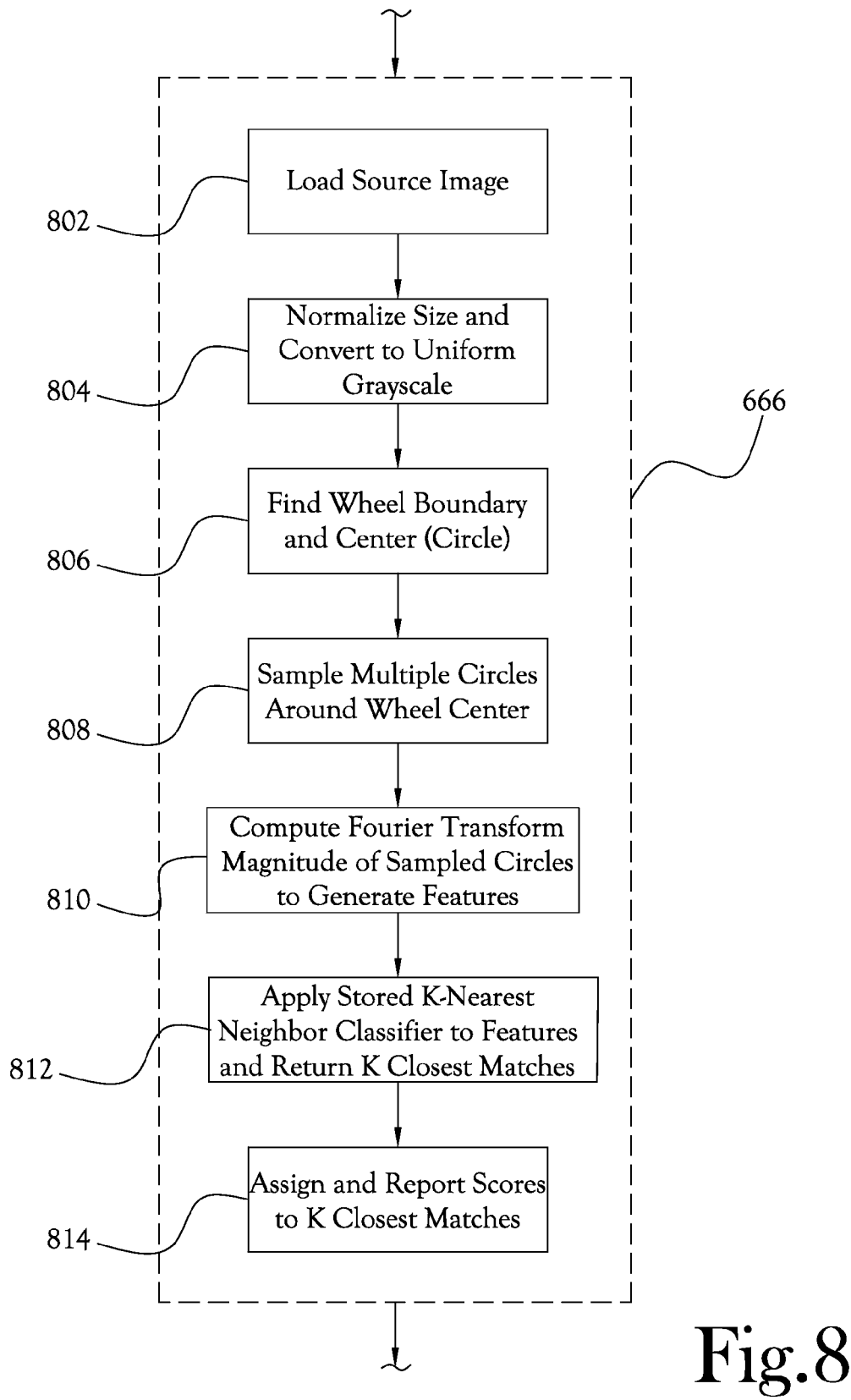
FIG. 8 is a flow diagram illustrating one example embodiment of the steps the computer software of the computer integrated into or in communication with the control module performs in matching images of unknown wheels to images of known wheels stored in the wheel feature database.

Once the wheel matching routine is initiated 666, the computer follows the steps set forth in the block diagram in FIG. 8. Referring now to FIG. 8, the subroutine loads the wheel image for the unknown wheel 802. The subroutine normalizes and converts the wheel image to uniform grayscale 804, and finds the wheel boundary and the center of the wheel 806. The subroutine samples a plurality of points on multiple circles around the wheel center 808, and computes the Fourier transform magnitudes of sampled points on multiple circles of the wheel image to generate features of the wheel 810. The subroutine applies the stored K-nearest neighbor classifier to features of the unknown wheel and returns the K closest matches to the unknown wheel 812, and the subroutine assigns and reports scores to K closest matches for the wheel for later display on a monitor. The wheel matching routine ends for that wheel and control is returned to the main program. In some embodiments of the present general inventive concept, the computer software routine that applies the K-nearest neighbor classifier to return the K closest matches for an unknown wheel is configured to limit the number of known wheels to be compared with the unknown wheels by selecting only known wheels which have the same height and width as the height and width of the unknown wheel.

In some embodiments of the present inventive concept, the subroutine 810 of FIG. 8 that computes Fourier transform magnitudes of sampled points on multiple circles of the wheel image to generate features of the unknown wheel comprises building a matrix which stores the calculated Fourier transform magnitude for each sampled point, with the X-axis of the matrix representing the sampled circles and the Y-axis of the matrix representing the sampled points on each circle. In some embodiments of the present inventive concept, the subroutine 812 of FIG. 8 that applies stored K-nearest neighbor classifier to features of the unknown wheel comprises comparing the features of an unknown wheel with the features of known wheels using the K-nearest neighbor classifier to determine the nearest potential matches of the unknown wheel with known wheels in the wheel feature database. Then, the subroutine at 814 compares the level of each potential match and reports the score level of each potential match for subsequent display on the monitor 30 in front of the operator. In some embodiments of the present inventive concept, the subroutine that reports the score level of each potential match includes a subroutine that computes the closeness of the features of the unknown wheel to the features of the wheel that potentially matches the unknown wheel and compares the resulting distance of the match to predetermined parameters in the form of a range of acceptable distances the unknown wheel may be from the known wheel that has been identified as a potential match to the unknown wheel.

Figure 9:
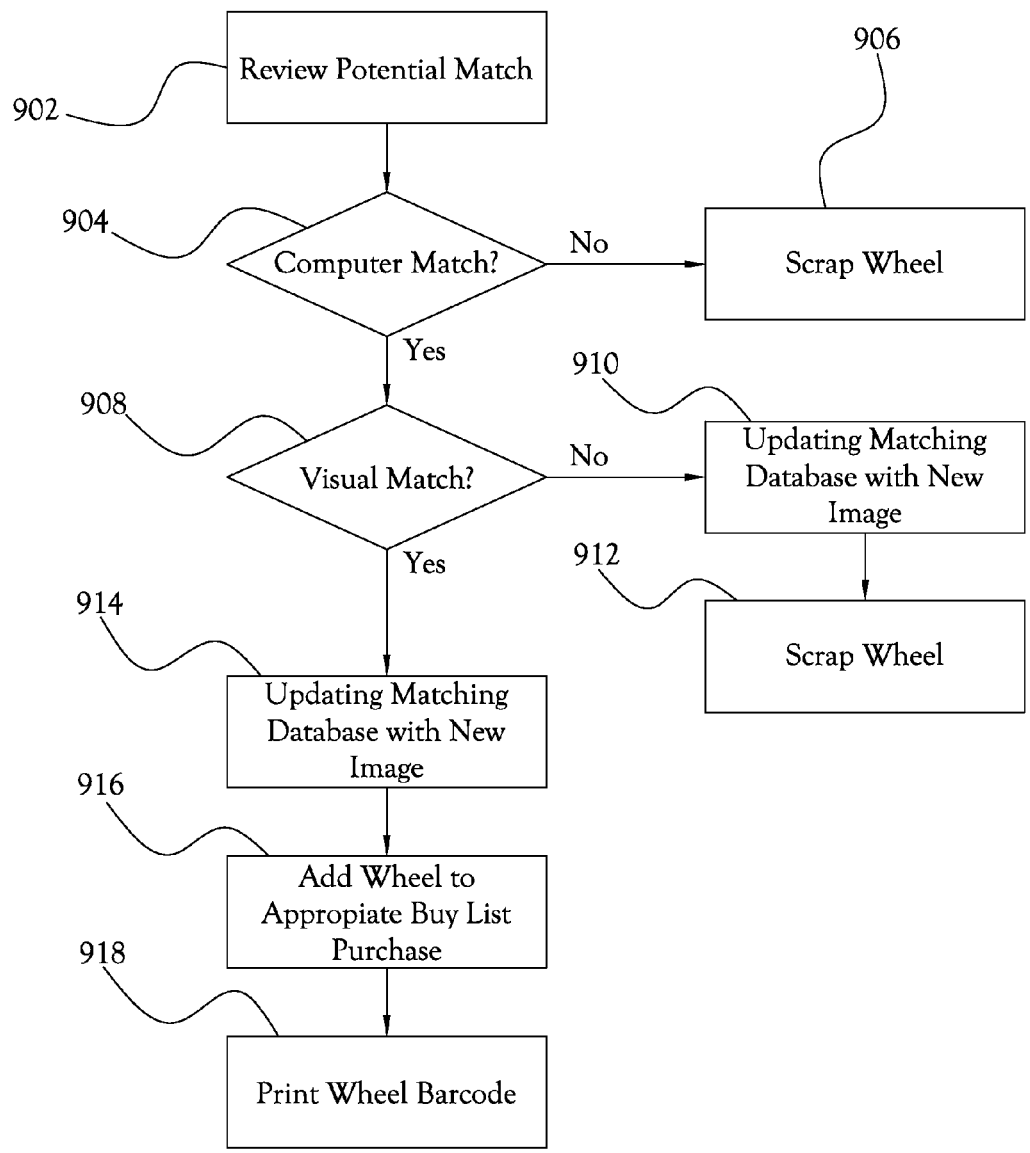
FIG. 9 is a flow diagram illustrating one example embodiment of the steps performed by the second inspection station in confirming matches of unknown wheels to known wheels and taking follow-up actions.

In some embodiments of the present inventive concept, an operator at the second inspection station performs the steps set forth in the block diagram in FIG. 9. Referring to FIG. 9, at 902, the operator reviews the potential match information for the wheel shown on the monitor 30 and compares the potential match information to the operator's visual inspection of the wheel. At 904, the operator confirms that an acceptable potential match is shown on the monitor. If an acceptable potential match is not shown on the monitor 904, the wheel is scrapped 906. If an acceptable potential match is shown on the monitor 904, the operator confirms, by visual inspection and by reviewing the data on the monitor 30, whether the wheel satisfies the second set of criteria 908. If the operator determines 908 that the wheel does not match the second set of criteria, the wheel feature database is updated with the new image of the wheel 910, and the wheel is scrapped 912. If the operator confirms 908 that the wheel satisfies the second set of criteria, the wheel feature database is updated with the new image of the wheel 914, the wheel is added to the appropriate buy list as a purchase 916, and a barcode is printed for attachment to the wheel 918. After the barcode is attached to the selected wheel, the wheel will be placed on a core skid 46 awaiting transfer to the appropriate area for further processing and handling. In some embodiments of the present inventive concept, a computer software routine is included that allows the system to learn over time and to become more accurate over time, with the computer software routine configured to receive notification by the operator whether a potential match was an actual match and configured to replace a poor image of a known wheel previously stored in the wheel feature database with a better image taken by the camera 24 after the operator confirms that a potential match of an unknown wheel is a definite match to a known wheel.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. Some of the embodiments described above have included a control module with a computer integrated into or in communication with the control module. However, those skilled in the art will recognize that one or more computers, switches, controllers, communications interfaces and other components may either be integrated into the control module or distributed in various locations outside of the control module, but in operational communication with the control module, without departing from the spirit and scope of the present general inventive concept. Those skilled in the art will understand that additional conveyors and devices may be added to the wheel processing system without departing from the spirit or scope of applicant's general inventive concept. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A system for processing core wheels comprising:
   a computer station configured to allow receiving and loading of wheel images and other wheel information received from a third party to populate a wheel feature database for known wheels;
   a sorting station configured to allow sorting of a source of wheels according to a first set of criteria;
   a loading station configured to allow loading of the wheels onto a first conveyor;
   a first conveyor configured to receive a plurality of incoming wheels, allow examination of the wheels for sorting according to a second set of criteria, and discharge the wheels onto a second conveyor;
   a first inspection station disposed along the first conveyor, the first inspection station configured to examine the plurality of incoming wheels, to process images of the wheels to identify the closest potential matches of incoming wheels to known wheels in a wheel feature database, to compare said potential matches to a second set of criteria, and to discharge the wheels evenly spaced onto a second conveyor after processing and matching the images of the wheels;
   a second conveyor configured to receive a plurality of evenly spaced wheels discharged by the first conveyor, to maintain the spacing of the received wheels, and to direct the received wheels to a discharge end of the second conveyor unless pushed off to a third conveyor by a diverter mechanism being disposed along the second conveyor;
   a diverter mechanism disposed along the second conveyor, the diverter mechanism being configured to divert wheels conforming to the second set of criteria onto the third conveyor;
   a third conveyor configured to receive the diverted wheels and direct the diverted wheels to a second inspection station;
   a second inspection station disposed along the third conveyor, said second inspection station being configured to allow examination of the diverted wheels to confirm whether said wheels conform to the second set of criteria;
   a fourth conveyor configured to receive a plurality of wheels not conforming to the second set of criteria and to direct the received wheels through a cleaning station and on to the discharge end of the fourth conveyor;
   a cleaning station disposed along the fourth conveyor, said cleaning station configured to clean the wheels prior to the fourth conveyor discharging the wheels onto a fifth conveyor;
   a fifth conveyor configured to receive the clean wheels discharged from the fourth conveyor and to direct them into a bin area; and
   a bin area positioned proximate the discharge end of the fifth conveyor, said bin area configured to receive wheels conforming to the first set of criteria but failing the second set of criteria.

2. The system of claim 1, wherein the first inspection station comprises a wheel sensor disposed along the first conveyor, said wheel sensor configured to detect an approaching wheel and signal the control module that a wheel is approaching, a camera disposed along the first conveyor, said camera configured to capture images of wheels carried along the first conveyor and to communicate images of the wheel to the control module, and a control module in operational communication with the wheel sensor and in operational control of the camera, the diverter mechanism, and the motors of the first conveyor, the second conveyor and the fourth conveyor, said control module configured with a computer, integrated into or otherwise in communication with the control module, and computer software designed to make decisions whether to keep identified wheels and then to sort wheels to be kept from wheels to be scrapped by controlling the motors of the conveyors to space the wheels at equal intervals on the second conveyor so that the location of the selected wheels can be tracked by the computer of the control module and so that the diverter mechanism can be triggered by the control module once the selected wheel is in front of the diverter mechanism, with the wheels not selected continuing to the discharge end of the second conveyor.

3. The system of claim 2, wherein computer software in the computer integrated into or otherwise in communication with the control module is comprised of software routines designed to receive from third parties images and other wheel information for known wheels and to populate a wheel feature database of known wheels, to signal the first conveyor to move the incoming wheels in front of the camera one at a time, to signal the camera to take digital images of said wheels, to process and store digital images of said wheels, to compare images and features of unknown wheels with images and features of known wheels stored in a wheel feature database, to determine the closest matches of the unknown wheel to known wheels stored in the wheel feature database, to determine whether the potential matches for said wheels conform to the second set of criteria, to discharge said wheels evenly spaced onto a second conveyor after processing the images of said wheels, to keep track of the location of wheels conforming to the second set of criteria, and to signal the diverter mechanism to push selected wheels from the second conveyor onto the third conveyor when selected wheels are in front of the diverter mechanism.

4. The system of claim 3, wherein computer software in the computer integrated into or otherwise in communication with the control module is further comprised of software routines designed to receive from third party providers images of known wheels that have been assigned a unique identifying number, to normalize the size of the images, to convert the images to grayscale, to determine the features of the known wheels, to load the features of said known wheels into a wheel feature database stored in the computer, and to compute and save the K-nearest neighbor classifier for subsequent matching to images of unidentified wheels.

5. The system of claim 4, wherein the computer software in the computer integrated into or otherwise in communication with the control module that determines the features of known wheels is further comprised of software routines designed to process the image of a known wheel, determine the wheel boundary and the center of said known wheel, compute Fourier transform magnitudes of sampled points on multiple circles around the center of said known wheel, store the results for said known wheel in the wheel feature database.

6. The system of claim 5, wherein the computer software in the computer integrated into or otherwise in communication with the control module that computes Fourier transform magnitudes of sampled points on multiple circles of a known wheel image to generate features of said known wheel is further comprised of software routines designed to build a matrix to store the Fourier transform magnitude for each sampled point, with the X-axis of the matrix representing the sampled circles and the Y-axis of the matrix representing the sampled points on each circle.

7. The system of claim 4, wherein the computer software in the computer integrated into or otherwise in communication with the control module that computes the K-nearest neighbor classifier for the known wheels is further comprised of software routines designed to calculate said classifier using the wheel features for all known wheels stored in the wheel feature database.

8. The system of claim 3, wherein the computer software in the computer integrated into or otherwise in communication with the control module that processes the image of an unknown wheel and compares the features of the unknown wheel to known wheels to generate potential matches is further comprised of software routines designed to load the image of an unknown wheel taken by the camera, to normalize the size of the image, to convert the image to grayscale, to determine the features of said unknown wheel, to apply the K-nearest neighbor classifier to features of said unknown wheel to find the closest potential matches of said unknown wheel with known wheels stored in the wheel feature database, and to determine whether the potential matches are within predetermined parameters.

9. The system of claim 8, wherein the computer software in the computer integrated into or otherwise in communication with the control module that determines the features of unknown wheels is further comprised of software routines designed to determine the wheel boundary and the center of said unknown wheels and compute Fourier transform magnitudes of sampled points on multiple circles around the center of said unknown wheels.

10. The system of claim 9, wherein the computer software in the computer integrated into or otherwise in communication with the control module that computes Fourier transform magnitudes of sampled points on multiple circles of an unknown wheel image to generate features of the wheel is further comprised of software routines designed to build a matrix to store the Fourier transform magnitude for each sampled point, with the X-axis of the matrix representing the sampled circles and the Y-axis of the matrix representing the sampled points on each circle.

11. The system of claim 8, wherein the computer software in the computer integrated into or otherwise in communication with the control module that applies the K-nearest neighbor classifier to find the closest potential matches for an unknown wheel is further comprised of software routines designed to compare the features of the unknown wheel with features of all known wheels characterized by a K-nearest neighbor classifier.

12. The system of claim 8, wherein the computer software in the computer integrated into or otherwise in communication with the control module that determines if the matches are within predetermined parameters is further comprised of software routines designed to compute the distance of the features of the unknown wheel from the features of each potential match of a known wheel, to compare the resulting distance computation to acceptable distance ranges previously entered into the computer to determine if said match is within predetermined parameters, and to store the distance computation for said potential match for subsequent display on a monitor.

13. The system of claim 3, wherein the computer software in the computer integrated into or otherwise in communication with the control module that compares potential wheel matches to a second set of criteria is further comprised of software routines designed to compare said potential wheel matches to customer buy lists and other business criteria to determine if a wheel is to be selected for further review and confirmation by an operator.

14. A system for processing core wheels comprising:
a computer station configured to allow receiving and loading of wheel images and other wheel information received from a third party to populate a wheel feature database for known wheels;
a sorting station configured to allow sorting of a source of wheels according to a first set of criteria;
a loading station configured to allow loading of the wheels onto a first conveyor;
a first conveyor configured to receive a plurality of incoming wheels, accumulate and hold the incoming wheels, and discharge the wheels onto a second conveyor;
a second conveyor configured to allow examination of the wheels for sorting according to a second set of criteria;
a first inspection station disposed along the first and second conveyors, the first inspection station configured to examine the plurality of incoming wheels, to process images of the wheels to identify the closest potential matches of incoming wheels to known wheels in a wheel feature database, to compare said potential matches to a second set of criteria, and to discharge the wheels evenly spaced onto a third conveyor after processing and matching the images of the wheels;
a third conveyor configured to receive a plurality of evenly spaced wheels discharged by the second conveyor, to maintain the spacing of the received wheels, and to direct the received wheels to a discharge end of the third conveyor unless pushed off to a fourth conveyor by a diverter mechanism being disposed along the third conveyor;
a diverter mechanism disposed along the third conveyor, the diverter mechanism being configured to divert wheels conforming to the second set of criteria onto the fourth conveyor;
a fourth conveyor configured to receive the diverted wheels and direct the diverted wheels to a second inspection station;
a second inspection station disposed along the fourth conveyor, said second inspection station being configured to allow examination of the diverted wheels to confirm whether said wheels conform to the second set of criteria;
a fifth conveyor configured to receive a plurality of wheels not conforming to the second set of criteria and to direct the received wheels through a cleaning station and on to the discharge end of the fifth conveyor;

a cleaning station disposed along the fifth conveyor, said cleaning station configured to clean the wheels prior to the fifth conveyor discharging the wheels onto a sixth conveyor;

a sixth conveyor configured to receive the clean wheels discharged from the fifth conveyor and to accumulate and direct the wheels to the end of the sixth conveyor awaiting loading of the wheels onto pallets;

a seventh conveyor deck configured to hold a shipping pallet while the wheels are loaded in layers onto the pallet;

a wrapper station disposed above the seventh conveyor deck and configured to secure the layers of wheels onto the pallet as wheels are loaded onto the pallet for shipping; and an eighth conveyor configured to receive loaded pallets of wheels, to accumulate the loaded pallets, and to hold the loaded pallets until they are removed by a fork lift.

15. The system of claim 4, wherein the first inspection station comprises a wheel sensor disposed along the first conveyor, said wheel sensor configured to detect an approaching wheel and signal the control module that a wheel is approaching, a second sensor disposed along the second conveyor, said wheel sensor configured to detect that a wheel has moved into place under the camera and signal the control module that the wheel is in place, a camera disposed along the second conveyor, said camera configured to capture images of wheels on the second conveyor and to communicate images of the wheel to the control module, an infrared measuring device disposed along the second conveyor, said infrared measuring device configured to take measurements of wheels on the second conveyor and to communicate measurements of the wheel to the control module, and a control module in operational communication with the first wheel sensor and the second wheel sensor and in operational control of the camera, the infrared measuring device, the diverter mechanism, and the motors of the first conveyor, the second conveyor and the third conveyor and the fifth conveyor, said control module configured with a computer, integrated into or otherwise in communication with the control module, and computer software designed to make decisions whether to keep identified wheels and then to sort wheels to be kept from wheels to be scrapped by controlling the motors of the conveyors to space the wheels at equal intervals on the third conveyor and the fifth conveyor so that the location of the selected wheels can be tracked by the computer of the control module and so that the diverter mechanism can be triggered by the control module once the selected wheel is in front of the diverter mechanism, with the wheels not selected continuing to the discharge end of the third conveyor.

16. The system of claim 15, wherein computer software in the computer integrated into or otherwise in communication with the control module is comprised of software routines designed to receive from third parties images and other wheel information for known wheels and to populate a wheel feature database of known wheels, to signal the first conveyor to move the incoming wheels in front of the camera one at a time, to signal the camera to take digital images of said wheels, to process and store digital images of said wheels, to compare images and features of unknown wheels with images and features of known wheels stored in a wheel feature database, to determine the closest matches of the unknown wheel to known wheels stored in the wheel feature database, to determine whether the potential matches for said wheels conform to the second set of criteria, to discharge said wheels evenly spaced onto a third conveyor after processing the images of said wheels, to keep track of the location of wheels conforming to the second set of criteria, and to signal the diverter mechanism to push selected wheels from the third conveyor onto the fourth conveyor when selected wheels are in front of the diverter mechanism.

17. The system of claim 16, wherein computer software in the computer integrated into or otherwise in communication with the control module is further comprised of software routines designed to receive from third party providers images of known wheels that have been assigned a unique identifying number, to normalize the size of the images, to convert the images to grayscale, to determine the features of the known wheels, to load the features of said known wheels into a wheel feature database stored in the computer, and to compute and save the K-nearest neighbor classifier for subsequent matching to images of unidentified wheels.

18. The system of claim 17, wherein the computer software in the computer integrated into or otherwise in communication with the control module that determines the features of known wheels is further comprised of software routines designed to process the image of a known wheel, determine the wheel boundary and the center of said known wheel and compute Fourier transform magnitudes of sampled points on multiple circles around the center of said known wheel and store the results for said known wheel in the wheel feature database.

19. The system of claim 18, wherein the computer software in the computer integrated into or otherwise in communication with the control module that computes Fourier transform magnitudes of sampled points on multiple circles of a known wheel image to generate features of said known wheel is further comprised of software routines designed to build a matrix to store the Fourier transform magnitude for each sampled point, with the X-axis of the matrix representing the sampled circles and the Y-axis of the matrix representing the sampled points on each circle.

20. The system of claim 17, wherein the computer software in the computer integrated into or otherwise in communication with the control module that computes the K-nearest neighbor classifier is further comprised of software routines designed to calculate said classifier for said known wheel using the features for all known wheels stored in the wheel feature database.

21. The system of claim 16, wherein the computer software in the computer integrated into or otherwise in communication with the control module that processes the image of an unknown wheel and compares the features of the unknown wheel to known wheels to generate potential matches is further comprised of software routines designed to load the image of an unknown wheel taken by the camera, to normalize the size of the image, to convert the image to grayscale, to determine the features of said unknown wheel, to apply the K-nearest neighbor classifier to features of said unknown wheel to find the closest potential matches of said unknown wheel with known wheels stored in the wheel feature database, and to determine whether the potential matches are within predetermined parameters.

22. The system of claim 21, wherein the computer software in the computer integrated into or otherwise in communication with the control module that determines the features of unknown wheels is further comprised of software routines designed to determine the wheel boundary and the center of said unknown wheels and compute Fourier transform magnitudes of sampled points on multiple circles around the center of said unknown wheels.

23. The system of claim 22, wherein the computer software in the computer integrated into or otherwise in communication with the control module that computes Fourier transform magnitudes of sampled points on multiple circles of an unknown wheel image to generate features of the wheel is further comprised of software routines designed to build a matrix to store the Fourier transform magnitude for each sampled point, with the X-axis of the matrix representing the sampled circles and the Y-axis of the matrix representing the sampled points on each circle.

24. The system of claim 21, wherein the computer software in the computer integrated into or otherwise in communication with the control module that applies the K-nearest neighbor classifier to find the closest potential matches for an unknown wheel is further comprised of software routines designed to compare the features of said unknown wheel to the features of known wheels characterized by the K-nearest neighbor classifier and to return the nearest potential matches for said unknown wheel.

25. The system of claim 24, wherein the computer software in the computer integrated into or otherwise in communication with the control module that applies the K-nearest neighbor classifier to find the closest potential matches for an unknown wheel is further comprised of software routines designed to limit the number of known wheels to be compared to the unknown wheel by selecting only known wheels which have the same height and width as the height and width of the unknown wheel.

26. The system of claim 21, wherein the computer software in the computer integrated into or otherwise in communication with the control module that determines whether the potential matches are within predetermined parameters is further comprised of software routines designed to compute the distance of the features of each potential match of an unknown wheel from the features of a known wheel, to compare the resulting distance computation to acceptable distance ranges previously entered into the computer to determine if said match is within predetermined parameters, to store the distance computation for said potential match for subsequent display on a monitor, and to learn whether potential matches are actual matches.

27. The system of claim 26, wherein the computer software in the computer integrated into or otherwise in communication with the control module that permits the system to learn whether potential matches are actual matches is further comprised of software routines designed to receive notification by the operator whether a potential match was an actual match, thus allowing the system to learn and increase its accuracy over time.

28. The system of claim 27 pertaining to allowing the system to increase its accuracy over time is comprised of software routines designed to replace a poor image of a known wheel previously stored in the wheel feature database with a better image taken by the camera after the operator confirms that a potential match of an unknown wheel is a definite match to a known wheel.

29. The system of claim 16, wherein the computer software in the computer integrated into or otherwise in communication with the control module that compares potential wheel matches to a second set of criteria is further comprised of software routines designed to compare said potential wheel matches to wheels listed in customer buy lists and other business criteria to determine whether a wheel is to be selected for further review and confirmation by an operator.

30. The system of claim 14, wherein the loading station is comprised of a hopper above a vibrating chute, with said hopper configured for fork lift dumping of wheels into said hopper, and with said vibrating chute configured to position the wheels for loading onto the first conveyor.

31. A method for processing core wheels comprising:
receiving images of known wheels having unique identifying numbers and other wheel information received from third party providers;
processing images of the known wheels to determine the features of said wheels;
storing the images, features and other wheel information for the known wheels for future reference;
providing a supply of wheels to a first location;
sorting the wheels to separate at least a first portion of the wheels conforming to a first set of criteria from the supply of wheels;
transporting the first portion of the wheel supply to a second location;
processing images of the first portion of the wheel supply;
spacing the wheels in the first portion of the wheel supply at equal intervals;
separating a second portion of the wheels conforming to a second set of criteria from the first portion of the wheels;
transporting the second portion of the wheels to a third location;
verifying conformity of the second portion of the wheels to the second set of criteria; and
transporting to a fourth location the remainder of the first portion of the wheels not conforming to the second set of criteria.

32. The method of claim 31, further comprising taking measurements of the first portion of the wheels and storing said measurements.

33. The method of claim 31, further comprising cleaning the remainder of the first portion of the wheels not conforming to the second set of criteria.

34. The method of claim 31, further comprising loading the remainder of the first portion of the wheels not conforming to the second set of criteria in layers onto a pallet by means of a hydraulic scissor lift configured to lower and raise the conveyor deck to position the pallet for loading of each layer of wheels.

35. The method of claim 31, further comprising securing the remainder of the first portion of the wheels not conforming to the second set of criteria to a pallet by means of a rotating wrapper configured to wrap the pallet and multiple layers of wheels in overlapping material.

36. The method of claim 31 pertaining to processing images of known wheels to determine the features of said wheels and storing the features of said wheels for future reference, further comprising loading of wheel images and other information received from third party providers, normalizing the size of the images, converting the images to grayscale, determining the features of the known wheel, loading the features of the known wheels into a wheel feature database stored in the computer, and computing and saving the K-nearest neighbor classifier for subsequent matching to images of unidentified wheels.

37. The method of claim 36 pertaining to determining the features of a known wheel, further comprising determining the wheel boundary and the center of said known wheel and computing the Fourier transform magnitudes of sampled points on multiple circles of said wheel image to generate features of said known wheel for storage in the wheel feature database.

38. The method of claim 37 pertaining to computing the Fourier transform magnitudes of sampled points on multiple circles of the digital image of the known wheel to generate features of said wheel, further comprising building a matrix to store the Fourier transform magnitude for each sampled point, with the X-axis of the matrix representing the sampled circles and the Y-axis of the matrix representing the sampled points on each circle.

39. The method of claim 36 pertaining to computing the K-nearest neighbor classifier, further comprised of calculating said classifier using the features of all known wheels stored in the wheel feature database.

40. The method of claim 31 pertaining to processing images of the first portion of the wheel supply, further comprising loading the image of an unknown wheel taken by the camera, normalizing the size of the image, converting the image to grayscale, determining the features of said unknown wheel, applying K-nearest neighbor classifier to features of said unknown wheel to find the closest potential matches of said unknown wheel with known wheels stored in the wheel feature database, and determining whether said potential matches are within predetermined parameters.

41. The method of claim 40 pertaining to determining the features of the unknown wheel, further comprising determining the wheel boundary and the center of said unknown wheels and computing Fourier transform magnitudes of sampled points on multiple circles around the center of said unknown wheel.

42. The method of claim 41 pertaining to computing Fourier transform magnitudes of sampled points on multiple circles of an unknown wheel image to generate features of the wheel, further comprising building a matrix to store the Fourier transform magnitude for each sampled point, with the X-axis of the matrix representing the sampled circles and the Y-axis of the matrix representing the sampled points on each circle.

43. The method of claim 40 pertaining to applying the K-nearest neighbor classifier to find the closest potential matches for an unknown wheel, further comprising comparing the features of said unknown wheel with the features of known wheels stored in a K-nearest neighbor classifier and returning the nearest potential matches for said unknown wheel.

44. The method of claim 43 pertaining to applying the K-nearest neighbor classifier for the unknown wheel, further comprising limiting the number of known wheels to be compared to the unknown wheel by selecting only known wheels which have the same height and width as the height and width of the unknown wheel.

45. The method of claim 40 pertaining to determining whether the potential matches are within predetermined parameters, further comprising computing the distance of the features of each potential match of an unknown wheel from the features of a known wheel, comparing the resulting distance computation to acceptable distance ranges previously entered into the computer to determine if said potential match is within predetermined parameters, and storing the distance computation for said potential match for subsequent display on a monitor.

46. The method of claim 31 pertaining to separating a second portion of the wheels conforming to a second set of criteria from the first portion of the wheels, further comprising comparing potential wheel matches to wheels listed in customer buy lists and other business criteria to determine whether a wheel is to be selected for further review and confirmation by an operator.

47. The method of claim 31 pertaining to the operation of spacing the wheels in the first portion of the wheel supply at equal intervals, further comprising the control module receiving a signal from the wheel sensor that an incoming wheel is approaching the camera, stopping the conveyor with a wheel under the camera, signaling the camera to capture the image of said wheel, restarting the conveyor under the camera to transport the wheel to the next conveyor, advancing the conveyors that are downstream of the camera and that are controlled by the control module at equal set distances to keep the wheels spaced at equal intervals.

48. The method of claim 31 pertaining to verifying conformity of the second portion of the wheels to the second set of criteria, further comprising notifying the system whether the potential match was an actual match allowing the system to learn and increase its accuracy over time.

49. The method of claim 48 pertaining to notifying the system whether the potential match was an actual match, further comprising replacing a poor image of a known wheel previously stored in the wheel feature database with a better image taken by the camera after the operator confirms that a potential match of an unknown wheel is a definite match to a known wheel.

* * * * *